(12) United States Patent  
Fukumoto

(10) Patent No.: US 7,944,652 B2  
(45) Date of Patent: May 17, 2011

(54) INVERTER WITH PROTECTION FUNCTION

(75) Inventor: Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 369 days.

(21) Appl. No.: 12/094,574

(22) PCT Filed: Nov. 21, 2006

(86) PCT No.: PCT/JP2006/323197  
§ 371 (c)(1),  
(2), (4) Date: May 21, 2008

(87) PCT Pub. No.: WO2007/060941  
PCT Pub. Date: May 31, 2007

(65) Prior Publication Data  
US 2009/0273738 A1    Nov. 5, 2009

(30) Foreign Application Priority Data

Nov. 22, 2005 (JP) .................................. 2005-337881  
Nov. 24, 2005 (JP) .................................. 2005-339439  
Nov. 24, 2005 (JP) .................................. 2005-339440

(51) Int. Cl.  
*H05B 41/16* (2006.01)

(52) U.S. Cl. ........................................ 361/23; 315/276

(58) Field of Classification Search .................... 361/18, 361/23; 315/276, 299, 308  
See application file for complete search history.

(56) References Cited

U.S. PATENT DOCUMENTS

| | | | |
|---|---|---|---|
| 5,239,253 A | 8/1993 | Shimizu et al. | |
| 2004/0130921 A1* | 7/2004 | Fukumoto | 363/98 |
| 2006/0038513 A1* | 2/2006 | Henry | 315/291 |
| 2008/0067957 A1* | 3/2008 | Hsieh | 315/307 |

FOREIGN PATENT DOCUMENTS

| | | |
|---|---|---|
| EP | 0061744 A2 | 10/1982 |
| EP | 1542347 A1 | 6/2005 |
| JP | 57-160371 | 10/1982 |
| JP | 63-001320 | 1/1988 |
| JP | 4-251518 | 9/1992 |
| JP | 5-199764 | 8/1993 |

(Continued)

OTHER PUBLICATIONS

International Search Report for International Patent Application No. PCT/JP2006/323197 mailed Feb. 13, 2007 with English Translation.  
International Preliminary Report on Patentability for International Patent Application No. PCT/JP2006/323197 issued May 27, 2008 with English Translation.  
Chinese Office Action for Application No. 200680017599.3 issued Jul. 3, 2009 with English translation.

(Continued)

*Primary Examiner* — Danny Nguyen  
(74) *Attorney, Agent, or Firm* — Cantor Colburn LLP

(57) ABSTRACT

A pulse width modulator generates a PWM signal whose duty ratio is feedback-controlled so that a detection voltage according to a current across a secondary coil of a transformer is brought close to a reference voltage. A logic control unit performs a switching control of the current across the primary coil of the transformer, based on the PWM signal outputted from the pulse width modulator. A first protection circuit detects a circuit failure of an inverter and stops the switching control of the inverter when the circuit failure continues for a predetermined duration of error detection time. A second protection circuit monitors a feedback voltage corresponding to an output voltage of the inverter, and lowers the reference voltage sets the duration of error detection time short when the feedback voltage is lower than a predetermined threshold voltage.

36 Claims, 22 Drawing Sheets

FOREIGN PATENT DOCUMENTS

| | | |
|---|---|---|
| JP | 7-45379 | 2/1995 |
| JP | 11-8929 | 1/1999 |
| JP | 2003-323994 | 11/2003 |
| JP | 2005-203379 | 7/2005 |

OTHER PUBLICATIONS

Notification of Reason(s) for Refusal for Japanese Patent Application No. 2007-546444 dispatched Jun. 8, 2010.

* cited by examiner

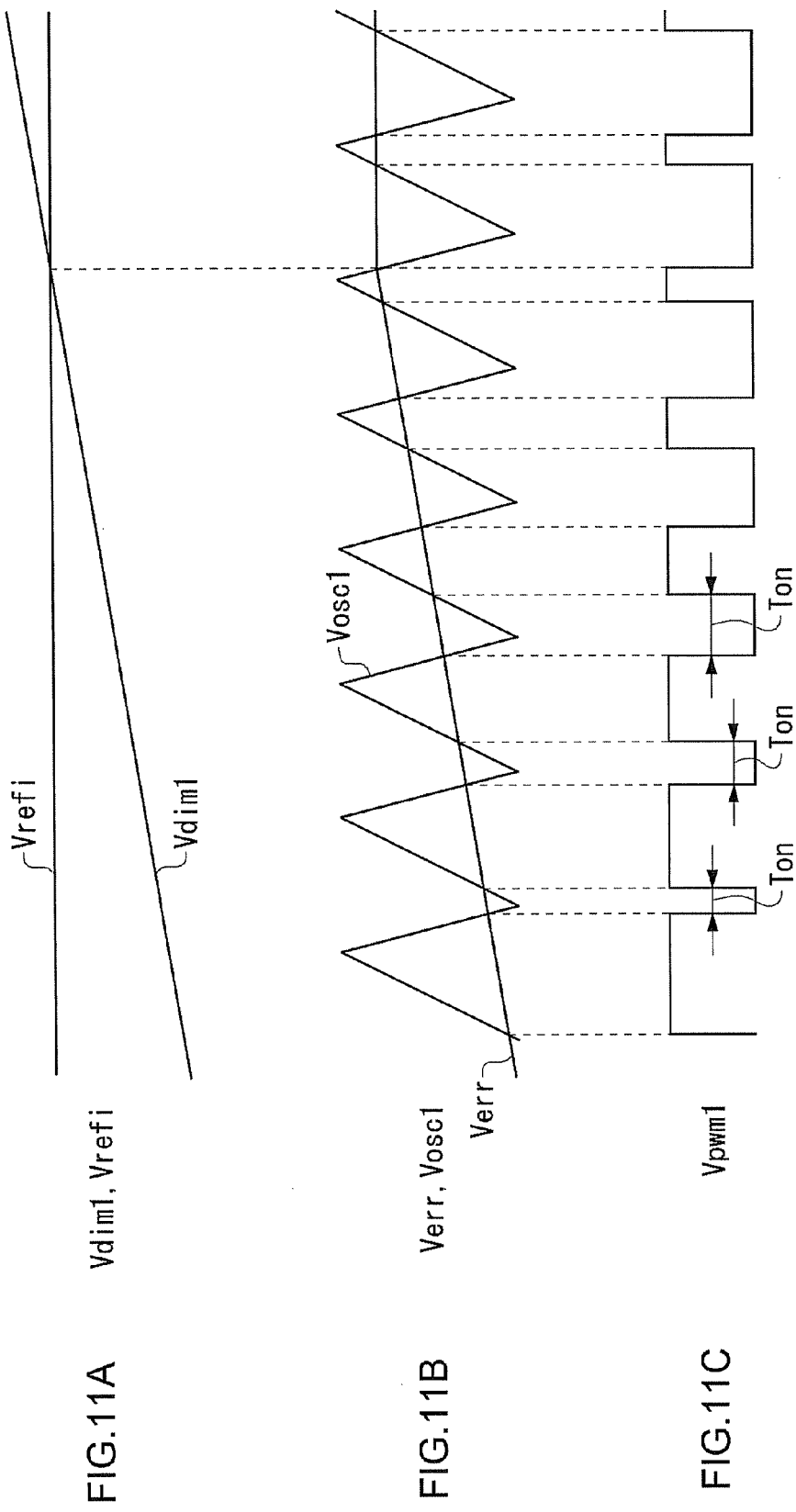

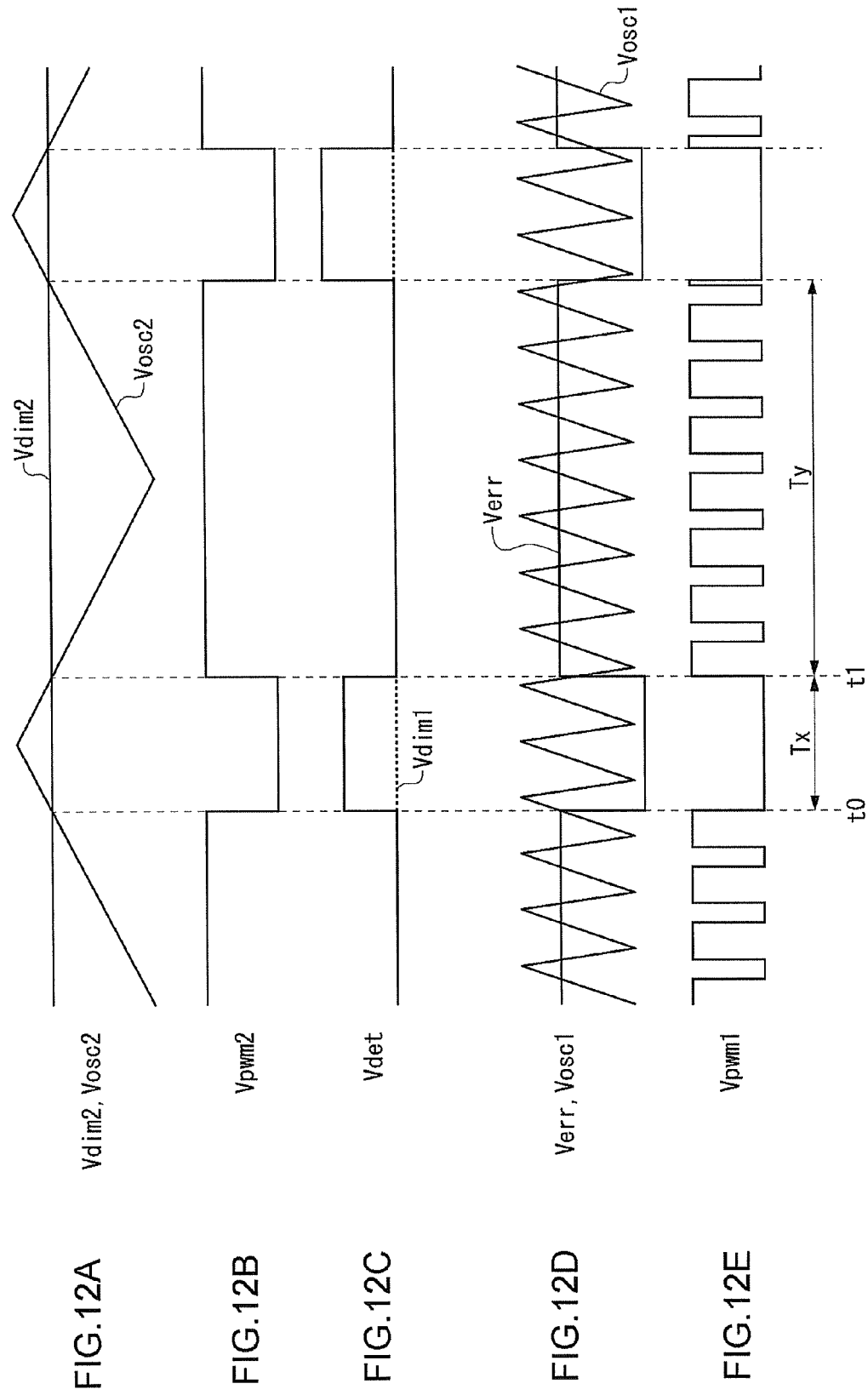

FIG.13A Vdet, Vdim1 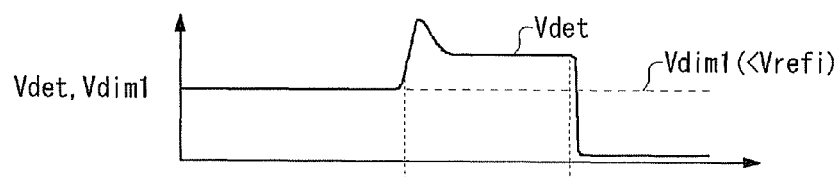
FIG.13B Verr 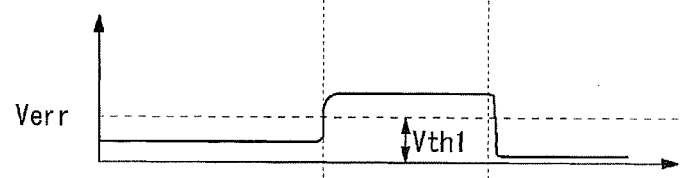
FIG.13C S5 (=S3) 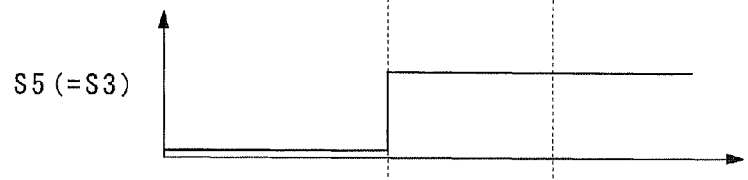
FIG.13D S6 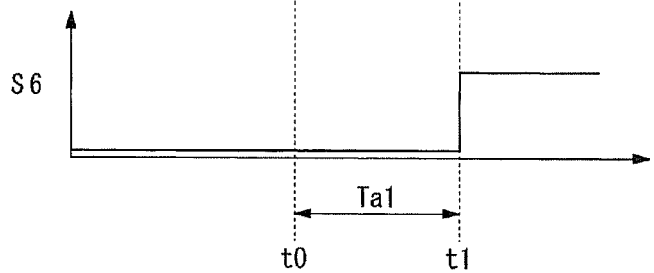

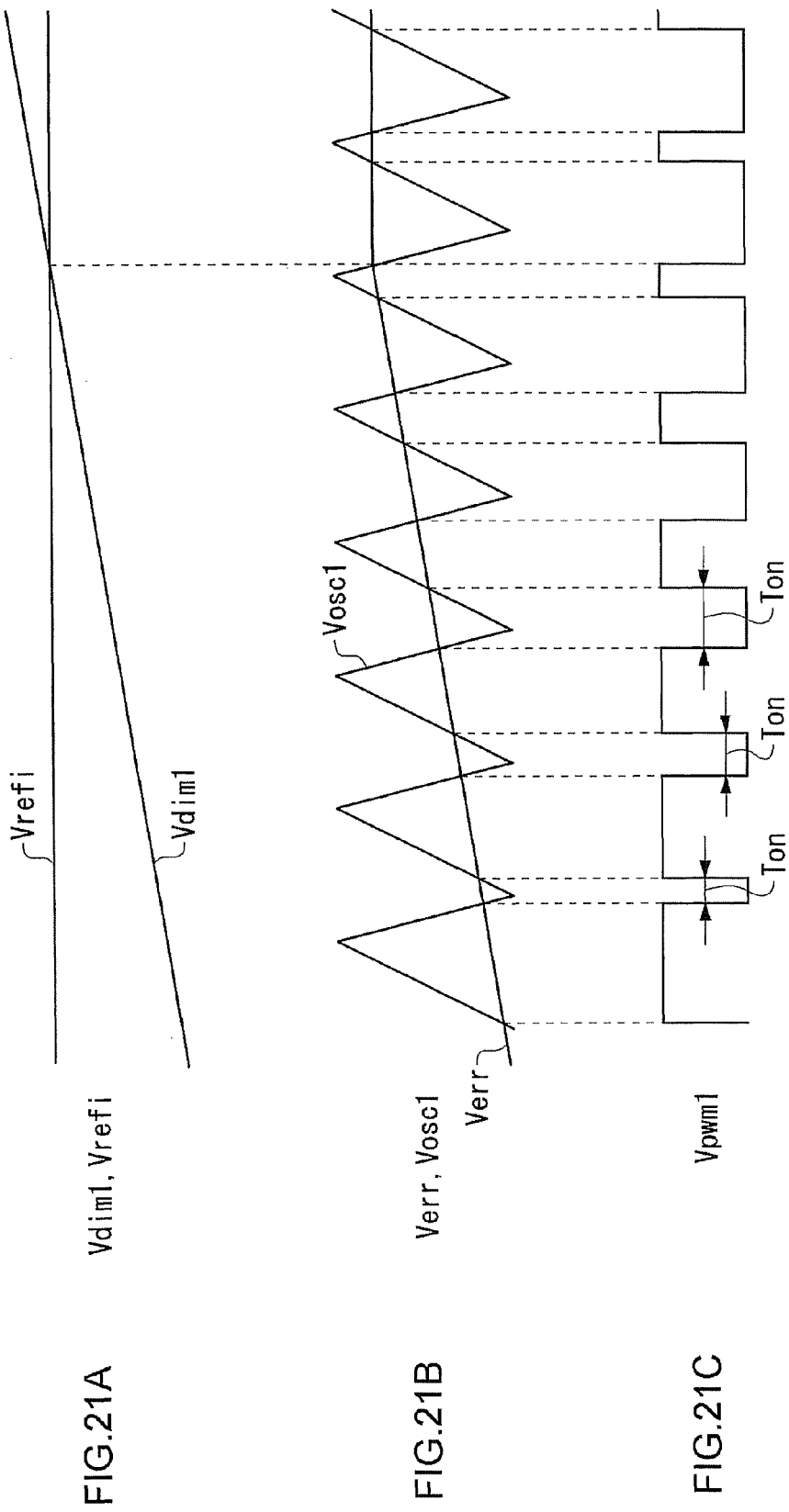

FIG.22A  Vdet2 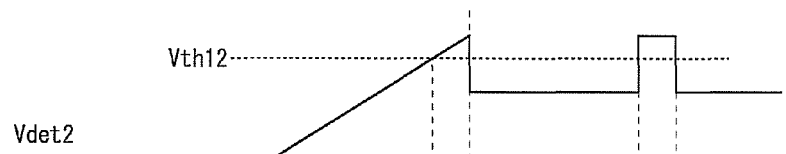
FIG.22B  Vdet1 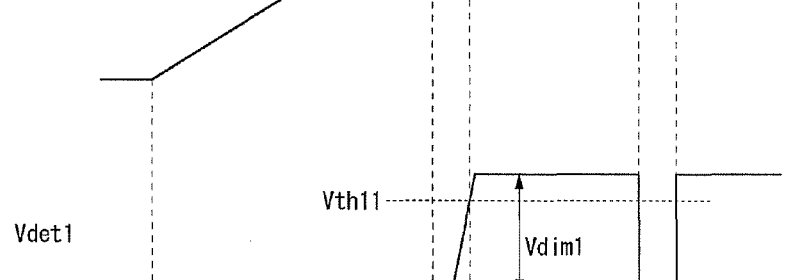
FIG.22C  S12 
FIG.22D  S11 
FIG.22E  S13 

INVERTER WITH PROTECTION FUNCTION

CROSS REFERENCE TO RELATED APPLICATIONS

This is a U.S. national stage of Application No. PCT/JP2006/323197, filed on 21 Nov. 2006. Priority under 35 U.S.C. §119 (a) and 35 U.S.C. §365(b) is claimed from Japanese Application No. 2005-337881, filed 22 Nov. 2005; Japanese Application No. 2005-339439, filed 24 Nov. 2005; and Japanese Application No. 2005-339440, filed 24 Nov. 2005, the disclosures of which are also incorporated herein by reference.

BACKGROUND OF THE INVENTION

1. Field of the Invention

The present invention relates to an inverter for supplying a fluorescent lamp and the like with drive voltage.

2. Description of the Related Art

In recent years, flat-screen LCD televisions growing in size and flatter in thickness are in wide use replacing the CRT televisions. In the LCD television, a plurality of cold cathode fluorescent lamps (hereinafter referred to as CCFL) or external electrode fluorescent lamps (hereinafter referred to as EEFL) are placed on the back surface of LCD panels on which images are displayed, and they emit light as backlight.

An inverter (DC/AC converter), which boosts DC voltage of, for example, about 12 V and outputs it as AC voltage, is used to drive CCFL or EEFL. The inverter converts the current flowing through CCFL, to a voltage and then feeds it back to a control circuit. Based on this fed-back voltage, the inverter controls the on and off of switching elements. For example, Patent Document 1 discloses a technology for driving fluorescent lamps by such an inverter.

[Patent Document 1] Japanese Patent Application Laid-Open No. 2003-323994.

1. In a case when a load such as a fluorescent lamp is driven at a high voltage, important is a technique for protecting a circuit against the circuit failures such as overcurrent, overvoltage, short-to-ground (ground short) and short-to-supply (source short). As for such circuitry protection, a method is generally implemented where the switching operation of an inverter is stopped when a circuit failure continues for a predetermined time period.

Nevertheless, there are cases where in this method the inverter continues to operate until a predetermined time period has elapsed after the circuit failure occurred and therefore such a technique is insufficient to protect the circuitry. In particular, if the fluorescent lamps are connected in parallel and driven, the circuit current will be very large and power consumed will rise to about several hundreds of W. Thus, protecting human bodies against earth fault and the like must be ensured.

To perform dimming control of adjusting the luminance of a fluorescent lamp, a control circuit in the inverter may be provided with a dimming function. There are two types of the dimming. One is a case where the dimming is set by a set maker that designs equipment on which the fluorescent lamps and inverters are mounted. The other is a case where the dimming is set when a user uses the equipment. As these dimming means, there are an analog dimming control (current dimming control), a burst dimming control where the fluorescent lamp emits light intermittently, and so forth.

The control circuit in the inverter circuit performs the above-described dimming and simultaneously protects the circuits by detecting the circuit failure such as non-lighting, overvoltage and overcurrent. Here, when the light controlling level set by the set maker or the user is to be maintained in the event that a circuit fault occurs in the inverter, problems may arise in the circuit operation. For example, when the inverter is short-circuited to the ground, driving the inverter to maintain the light control level causes a problem where the current continues to flow through a ground-short path.

A lamp such as EEFL generally emits light by utilizing the resonance of an leakage inductance and a parasitic capacitance of the lamp itself. Its resonance frequency fr is given by $fr=1/(2\times\pi\times\sqrt{LC})$ using an inductance L and a capacitance C.

Here, the parasitic capacitance of the lamp before a start of discharging is higher than that after the start of discharging. Thus, the resonance frequency changes at the time when the lamp emits light and when it does not. Consequently, it is desired that the control circuit in the inverter shall vary a switching frequency of a voltage applied to a transformer according to a lighting or non-lighting state of the lamp.

1. One embodiment of the present invention has been made in view of the problems described as above, and an advantage thereof is to provide a control circuit of an inverter that strengthens a protective function against circuit failures.
2. An advantage of another embodiment of the present invention is to provide a control circuit of an inverter capable of restricting a light control from outside.
3. An advantage of still another embodiment of the present invention is to provide a control circuit of an inverter capable of controlling a switching frequency in accordance with a state of a fluorescent lamp to be driven.

1. One embodiment of the present invention relates to a control circuit for controlling an inverter including a transformer. This control circuit comprises: a pulse modulator which generates a pulse signal where a duty ratio thereof is feedback-controlled in a manner such that a detection voltage corresponding to a current across a secondary coil of the transformer is brought close to a reference voltage; a logic control unit which performs a switching control of the current across the primary coil of the transformer, based on the pulse signal outputted from the pulse modulator; a first protection circuit which detects a circuit failure of the inverter and which stops the switching control of the inverter when the circuit failure continues for a predetermined duration of error detection time; and a second protection circuit which monitors a feedback voltage corresponding to an output voltage of the inverter and which sets the duration of error detection time shorter and lowers the reference voltage when the feedback voltage is lower than a predetermined threshold voltage.

By implementing this embodiment, when error is detected by the first protection circuit and the output voltage of the inverter drops due to short-circuiting of a load or the like, a period until when the switching control will be stopped is shortened. Also, the output current of the inverter is forcibly reduced and the power consumption is reduced by lowing the reference voltage, so that the circuitry protection can be strengthened.

The second protection circuit may include: a voltage source which generates the threshold voltage; and a second comparator which compares the feedback voltage with the threshold voltage generated by the voltage source. During a start-up period after the control circuit is started, the voltage source may set the threshold voltage lower than that at normal operating time after the start-up period has elapsed.

In the case of performing a soft-start that raises slowly the output voltage after a start-up, the threshold voltage of the second protection circuit is set low during a start-up period after a start when the output voltage is low. A distinction can be made between a state where the output voltage is low due to the short-circuiting and a state where the output voltage is low due to the soft-start. Hence, the start-up period can be excluded from the circuit protection executed by the second protection circuit.

The first protection circuit may include: a capacitor whose potential at one end thereof is fixed; a current source which generates a charging current and charges the capacitor; and a first comparator which compares a voltage appearing across the capacitor with a voltage corresponding to the duration of error detection time. When the feedback voltage is lower than the threshold voltage, the second protection circuit may increase the charging current.

The pulse modulator, the logic control unit and the first and the second protection circuit may be integrated on a single semiconductor substrate. "Being integrated" includes a case where all of circuit components are formed on a semiconductor substrate and a case where the main components of a circuit are integrated thereon. Note that part of resistors or capacitors used to adjust circuit constants may be provided outside the semiconductor substrate. Integrating the control circuit as a single LSI can reduce the circuit area.

Another embodiment of the present invention relates to an inverter. This inverter comprises: a transformer; an above-described control circuit which performs a switching control on current across a primary coil of the transformer; and a current-voltage conversion unit, provided on a current path of a secondary coil of the transformer, which converts current flowing through the secondary coil into voltage so as to be fed back to the control circuit as the detection voltage.

Still another embodiment of the present invention relates to a light emitting device. This light emitting device comprises: a fluorescent lamp; and an above-described inverter which supplies output voltage to the fluorescent lamp as a drive voltage. Also, a plurality of the fluorescent lamps may be connected in parallel. Also, two of the inverters may be provided at both ends of the fluorescent lamp, respectively, and may supply drive voltages of mutually reversed phases to the fluorescent lamp. Also, the fluorescent lamp may be a cold cathode fluorescent lamp or may be an external electrode fluorescent lamp.

Still another embodiment of the present invention relates to a liquid-crystal television. This liquid-crystal television comprises: a liquid-crystal panel; and a plurality of light emitting devices arranged on a backside of the liquid-crystal panel.

2. Another embodiment of the present invention relates to a control circuit of an inverter for driving a fluorescent lamp. This control circuit comprises: a voltage source which generates a predetermined reference voltage; an error amplifier which amplifies error between either an analog dimming control voltage inputted externally to adjust the luminance of a fluorescent lamp to be driven or the reference voltage generated by the voltage source, whichever is lower, and a detection voltage according to a current flowing through a secondary coil of a transformer in the inverter; a pulse-width-modulation comparator which compares error voltage outputted from the error amplifier with a triangular wave voltage so as to output a pulse-width-modulation signal; and a logic control unit which performs a switching control of the current across the primary coil of the transformer, based on the pulse-width-modulation signal outputted from the pulse-width-modulation comparator.

According to this embodiment, when the analog dimming control voltage is lower than the reference voltage, a feedback is provided so that the detection voltage is brought close to the analog dimming control voltage. This can realize a light control from the outside. Also, when the analog dimming control voltage becomes higher than the reference voltage, a feedback is provided so that the detection voltage is brought close to the reference voltage. This can cause the fluorescent lamp to emit light at luminance predetermined by the control circuit. As a result, the current flowing through the secondary coil of the transformer can be restricted to a current value determined by the reference voltage or below it.

A control circuit may further comprise a protection circuit which monitors a feedback voltage according to an output voltage of the inverter and which lowers the reference voltage when the feedback voltage is lower than a predetermined threshold voltage.

In such a case, if the output voltage drops due to error such as ground-short, the reference voltage will be lowered. Thus, an upper limit of current flowing through the secondary coil of the transformer can be lowered, thus strengthening the circuitry protection.

A control circuit may further comprise an analog dimming stop switch provided between an input terminal of the analog dimming control voltage and the error amplifier. The analog dimming stop switch may be turned off when the fluorescent lamp to be driven does not emit light.

When the analog dimming is performed while the fluorescent lamp is not lit, it is further unlikely for the fluorescent to emit light. Consequently, the analog dimming stop switch is turned off when the fluorescent lamp is not lit. This invalidates the analog dimming and therefore a feedback is provided so that the current determined by the reference voltage flows through the fluorescent lamp, thus facilitating the emission of light.

When the feedback voltage is lower than the threshold voltage, the protection circuit may turn off the analog dimming stop switch.

In this case, if error such as ground-short is detected by the protection circuit, the analog dimming control voltage will not be inputted to the error amplifier. Hence, a feedback is provided so that the current determined by the reference voltage flows to a lamp. This can facilitate the lamp to emit light.

A control circuit may further comprise: a burst dimming comparator which compares a burst dimming control voltage inputted externally with a second triangular wave voltage whose frequency is set lower than that of the triangular wave voltage; and a forced off circuit which refers to an output signal of the burst dimming comparator and raises forcibly the detection voltage to a voltage value, where a duty ratio of the pulse-width-modulation signal becomes practically 0, during a period of which the burst dimming control voltage is lower than the second triangular wave voltage.

A "voltage value where a duty ratio of the pulse-width-modulation signal becomes practically zero" means a range where the switching of the current flowing through the primary coil of the transformer stops. In this case, the drive voltage is supplied intermittently to the fluorescent lamp according to the level of the output signal of the burst dimming comparator, so that the luminance of the fluorescent lamp can be adjusted.

When the feedback voltage is lower than the threshold voltage, the protection circuit may set the forced off circuit inactive and stop burst dimming.

In this case, if error such as ground-short is detected by the protection circuit, the light emission of the fluorescent lamp can be facilitated by stopping the burst light control.

The voltage source, the error amplifier, the pulse-width-modulation comparator and the logic control unit may be integrated on a single semiconductor substrate. Integrating the control circuit as a single LSI can reduce the circuit area.

Another embodiment of the present invention relates to an inverter. This inverter comprises: a transformer in which a fluorescent lamp to be driven is connected to a secondary coil thereof; a control circuit which performs a switching control on current across a primary coil of the transformer; and a current-voltage conversion unit, provided on a current path of the secondary coil of the transformer, which converts current flowing through the secondary coil into voltage so as to be fed back to the control circuit as the detection voltage.

Still another embodiment of the present invention relates to a light emitting device. This light emitting device comprises: a fluorescent lamp; and an inverter which supplies output voltage to the fluorescent lamp as a drive voltage. A plurality of the fluorescent lamps may be connected in parallel. Also, two of the inverters may be provided at both ends of the fluorescent lamp, respectively, and may supply drive voltages of mutually reversed phases to the fluorescent lamp. Further, the fluorescent lamp may be an external electrode fluorescent lamp or may be a cold cathode fluorescent lamp.

Still another embodiment of the present invention relates to a liquid-crystal television. This liquid-crystal television comprises: a liquid-crystal panel; a plurality of light emitting devices arranged on a backside of the liquid-crystal panel; and a signal processing unit which outputs the analog dimming control voltage to the inverter in the light emitting device.

3. Another embodiment of the present invention relates to a control circuit of an inverter for driving a fluorescent lamp. This control circuit comprises: an error amplifier which amplifies error between a dimming control voltage to adjust the luminance of a fluorescent lamp to be driven and a detection voltage according to a drive current flowing through a secondary coil of a transformer in the inverter; a triangular wave signal generator which generates a triangular wave signal; a pulse-width modulation-comparator which compares error voltage outputted from the error amplifier with the triangular wave voltage outputted from the triangular wave signal generator so as to output a pulse-width-modulation signal; a logic control unit which performs a switching control of the current across the primary coil of the transformer, based on the pulse-width-modulation signal outputted from the pulse-width-modulation comparator; and a frequency control unit which monitors detection voltages according to the drive current flowing through the secondary coil of the transformer and a drive voltage supplied to the fluorescent lamp from the inverter, respectively, and which raises the frequency of the triangular wave signal when a first detection voltage according to the drive current is lower than a first predetermined threshold voltage or a second detection voltage according to the drive voltage is higher than a second predetermined threshold voltage.

According to this embodiment, a state where the drive current is lower than a predetermined value or a state where the drive voltage is higher than a predetermined level is determined to be a state where the fluorescent lamp is not lit, and the frequency of the triangular wave signal is raised. Thus, the light-emitting property can be enhanced.

The frequency control unit may include: a first comparator which compares the first detection voltage according to the drive voltage with the first threshold voltage and which sets an output to a predetermined level when the first detection voltage is lower than the first threshold voltage; a second comparator which compares the second detection voltage according to the drive current with the second threshold voltage and which sets an output to a predetermined level when the second detection voltage is higher than the second threshold voltage; and a logic gate which performs a logical operation of the output signals of the first and the second comparator, wherein the frequency control unit may control the frequency of the triangular wave signal by an output signal of the logic gate.

The first comparator may set either a voltage proportional to the dimming control voltage or a predetermined reference voltage, whichever is lower, to the first threshold voltage with which the first detection voltage is compared.

In this case, when the voltage proportional to the dimming control voltage becomes lower than the reference voltage, the first threshold voltage to be compared with the first detection voltage varies according to the dimming control voltage. Thus, even when the fluorescent lamp is to emit light with low luminance, the lighting and non-lighting of the lamp can be suitably detected.

The triangular wave signal generator may include: a capacitor; and a charge-discharge circuit which supplies a charging current to the capacitor and pulls out a discharging current from the capacitor. The frequency control unit may raise the frequency of the triangular wave signal by increasing the charging current and the discharging current of the charge-discharge circuit.

The control circuit may be integrated on a single semiconductor substrate. Integrating the control circuit as a single LSI can reduce the circuit area.

Another embodiment of the present invention relates to an inverter equipped with the above-described control circuit. This inverter comprises: a transformer in which a fluorescent lamp to be driven is connected to a secondary coil thereof; a above-described control circuit which performs a switching control on current across a primary coil of the transformer; a drive voltage detection unit which converts the drive voltage, supplied to the fluorescent lamp to be driven, into a direct-current voltage by half-wave rectifying the drive voltage and feeds back the voltage to the control circuit as the first detection voltage; and a current-voltage conversion unit, provided on a current path of the secondary coil of the transformer, which converts drive current flowing through the secondary coil into voltage so as to be fed back to the control circuit as the second detection voltage.

According to this embodiment, the drive voltage and drive current for the fluorescent lamp are fed back to the control circuit so as to determine the light or non-lighting state of the fluorescent. Thus the drive frequency of the transformer can be optimally switched.

Still another embodiment of the present invention relates to a light emitting device. This light emitting device comprises: a fluorescent lamp; and an above-described inverter which supplies output voltage to the fluorescent lamp as a drive voltage.

According to this embodiment, the light-emitting property of the fluorescent lamp can be improved.

A plurality of the fluorescent lamps may be connected in parallel. Two of the inverters may be provided at both ends of the fluorescent lamp, respectively, and may supply drive voltages of mutually reversed phases to the fluorescent lamp. The fluorescent lamp may be an external electrode fluorescent lamp or may be a cold cathode fluorescent lamp.

Still another embodiment of the present invention relates to a liquid-crystal television. This liquid-crystal television comprises: a liquid-crystal panel; and a plurality of light emitting devices arranged on a backside of the liquid-crystal panel.

According to this embodiment, the light-emitting property of the fluorescent lamp used as backlight of liquid crystal can be enhanced.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 11A to 11C are voltage waveform diagrams showing operating states of an inverter;

FIGS. 12A to 12E are timing charts to explain burst dimming;

FIGS. 13A to 13D are timing charts showing operating states of an inverter of FIG. 6 with no ground short;

FIGS. 21A to 21C are voltage waveform diagrams showing operating states of an inverter; and FIGS. 22A to 22E are timing charts showing how a frequency control unit performs a frequency control.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
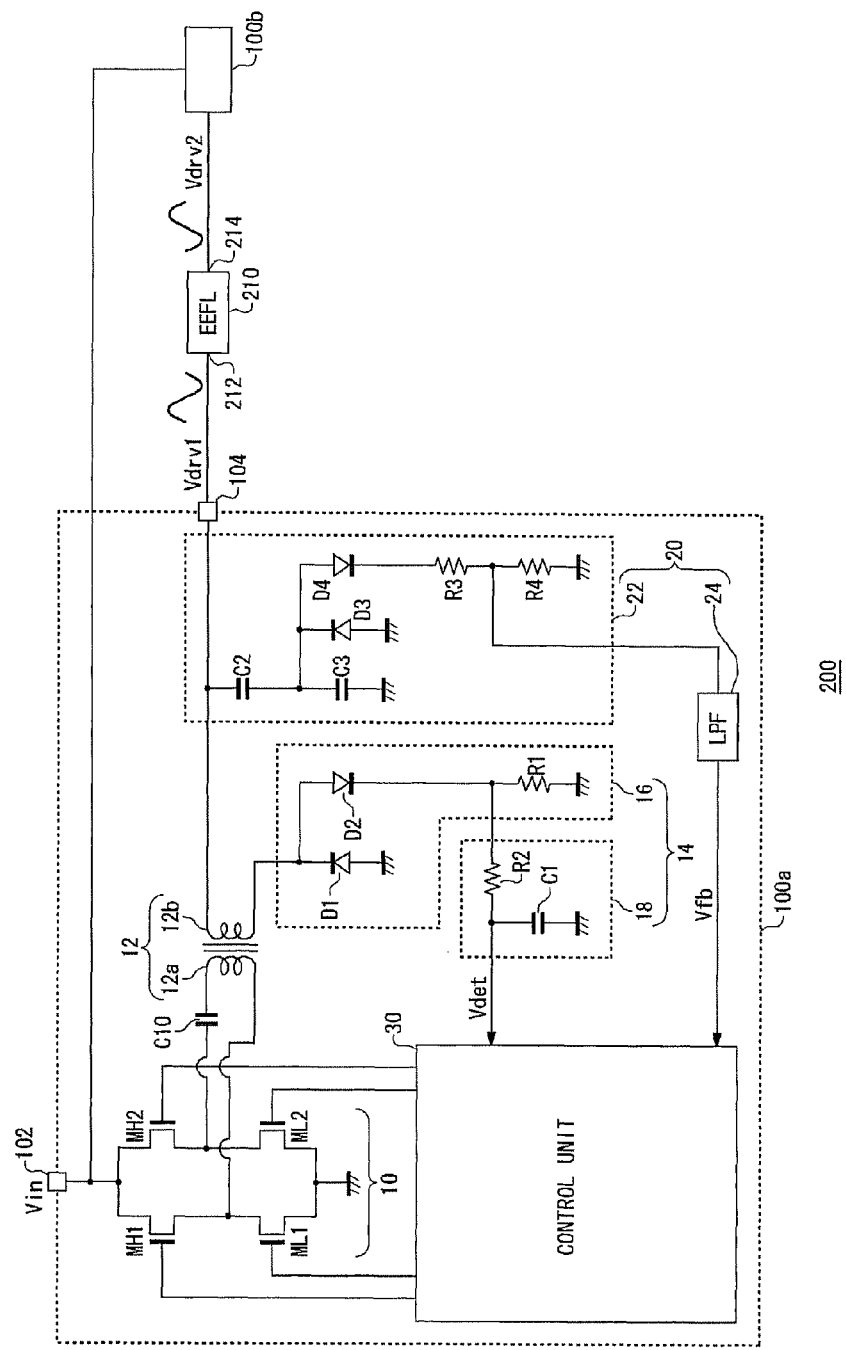
FIG. 1 is a circuit diagram showing a structure of a light emitting device according to a first embodiment.
Figure 2:
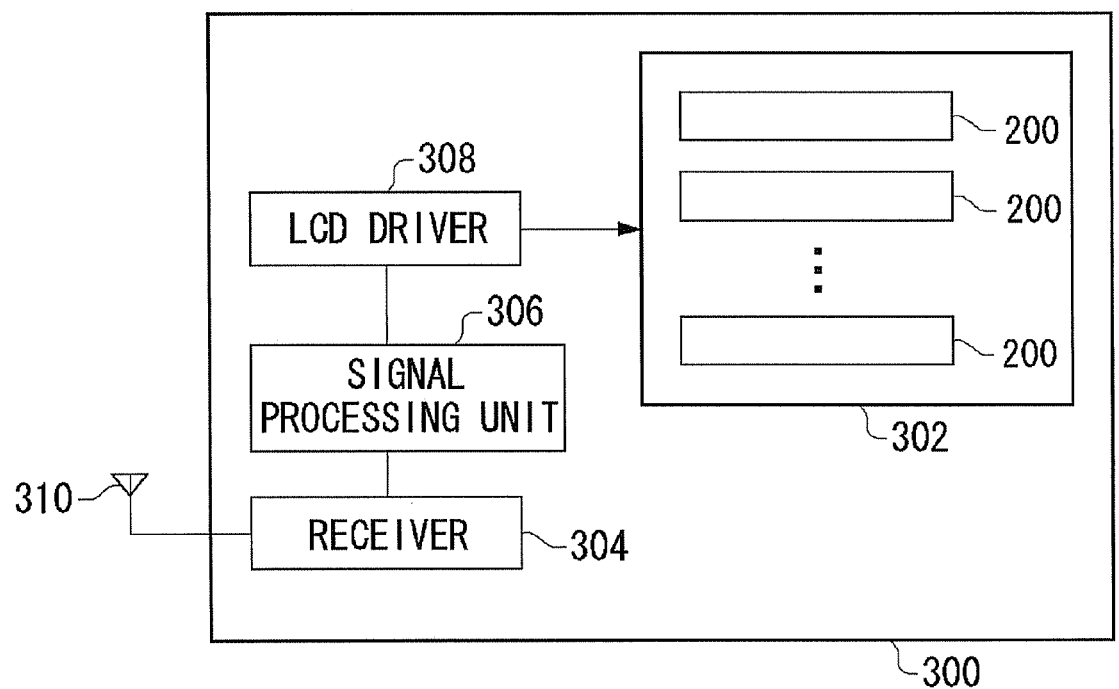
FIG. 2 is a block diagram showing a structure of an LCD television on which light emitting devices of FIG. 1 are mounted.

FIG. 1 is a circuit diagram showing a structure of a light emitting device 200 according to a first embodiment of the present invention. FIG. 2 is a block diagram showing a structure of an LCD television 300 on which the light emitting devices 200 of FIG. 1 are mounted. The LCD television 300 is connected to an antenna 310. The antenna 310 receives broadcast waves and outputs received signals to a receiver 304. The receiver 304 detects and amplifies the received signal so as to be outputted to a signal processing unit 306. The signal processing unit 306 outputs image data, acquired by demodulating the modulated data, to an LCD driver 308. The LCD driver 308 outputs the image data to an LCD panel 302 for each scanning line so as to display videos and images. On the backside of the LCD panel 302, a plurality of light emitting devices 200 are arranged as backlight. The light emitting devices 200 according to the present embodiment can be suitably used as the backlight for such an LCD panel 302. Hereinbelow, referring back to FIG. 1, a detailed description will be given of a structure and an operation of the light emitting device 200.

The light emitting device 200 according to the present embodiment includes an EEFL 210, a first inverter 100a, and a second inverter 100b. The EEFL 210 is placed on the back surface of the LCD panel 302. The first inverter 100a and the second inverter 100b, which are each a DC/AC converter, convert an input voltage Vin, outputted from a DC power supply and inputted to an input terminal 102, into AC voltage and boost it so as to supply a first drive voltage Vdrv1 and a second drive voltage Vdrv2 to a first terminal 212 and a second terminal 214 of the EEFL 210, respectively. The first drive voltage Vdrv1 and the second drive voltage Vdrv2 are AC voltages having mutually reversed phases.

Though there is provided a single EEFL 210 in FIG. 1, a plurality of EEFLs may be arranged in parallel with one another. A description is given hereunder of a structure of the first inverter 100a and the second inverter 100b according to the present embodiment. The first inverter 100a and the second inverter 100b have a similar structure to each other. Thus no distinction will be made therebetween and they will be generically referred to as "inverter 100" in the following description.

The inverter 100 includes an H-bridge circuit 10, a transformer 12, a current-voltage conversion unit 14, a drive voltage detection unit 20, a control circuit 30, and a capacitor C10.

The H-bridge circuit 10 includes four power transistors which are a first high-side transistor MH1, a first low-side transistor ML1, a second high-side transistor MH2 and a second low-side transistor ML2.

One end of the first high-side transistor MH1 is connected to an input terminal 102 to which an input voltage is applied, whereas the other end thereof is connected to a first terminal of a primary coil 12a of the transformer 12. One end of the first low-side transistor ML1 is connected to a ground terminal where the potential thereof is fixed, whereas the other end thereof is connected to the first terminal of the primary coil 12a. One end of the second high-side transistor MH2 is connected to the input terminal 102, whereas the other end thereof is connected to a second terminal of the primary coil via the DC-blocking capacitor C10. One end of the second low-side transistor ML2 is connected to the ground terminal, whereas the other end thereof is connected to the second terminal of the primary coil 12a via the DC-blocking capacitor C10.

The current-voltage conversion unit 14 is provided on a current path of the secondary coil 12b of the transformer 12. The current-voltage conversion unit 14 converts the current flowing through the secondary coil 12b, namely the current flowing through the EEFL 210, into a voltage so as to output it as a detection voltage Vdet. The current-voltage conversion unit 14 includes a rectifier circuit 16 and a filter 18.

The rectifier circuit 16 includes a first diode D1, a second diode D2, and a first resistor R1. An anode of the first diode D1 is grounded, whereas a cathode thereof is connected to one end of the secondary coil 12b. An anode of the second diode D2 is connected with the cathode of the first diode D1. The first resistor R1 is provided between a cathode of the second diode D2 and ground. The AC current flowing through the secondary coil 12b is half-wave rectified by the first diode D1 and the second diode D2 so as to flow through the first resistor R1. A voltage drop which is proportional to the current flowing through the secondary coil 12b occurs across the first resistor R1. The rectifier circuit 16 outputs the voltage drop across the first resistor R1.

The filter 18 is a low-pass filer that includes a second resistor R2 and a first capacitor C1. The filter 18 feeds back the detection voltage Vdet, where high-frequency components have been removed, to the control circuit 30.

The drive voltage detection unit 20, which is provided between an output terminal 104 of the inverter 100 and ground, is configured by including a rectifier circuit 22 and a filter 24. The drive voltage detection unit 20 generates a DC feedback voltage Vfb according to a drive voltage Vdrv outputted from the inverter 100 and then feeds it back to the control circuit 30.

The rectifier circuit 22 includes a second capacitor C2, a third capacitor C3, a third diode D3, a fourth diode D4, a third resistor R3, and a fourth resistor R4. The second capacitor and the third capacitor C3 are connected in series between the output terminal 104 and ground. An anode of the third diode D3 is grounded, whereas a cathode thereof is connected with a connection point of the second capacitor C2 and the third capacitor C3. An anode of the fourth diode D4 is connected to the cathode of the third diode D3. The third resistor R3 and the fourth resistor R4 are connected in series between a cathode of the fourth diode D4 and ground. The drive voltage Vdrv outputted from the output terminal 104, which is AC voltage, is voltage-divided by the second capacitor C2 and the third capacitor C3. The divided drive voltage Vdrv is half-wave rectified by the third diode D3 and the fourth diode D4 and is then further voltage-divided by the third resistor R3 and the fourth resistor R4. The drive voltage divided by the third resistor R3 and the fourth resistor R4 is outputted to the filter 24.

The filter 24 feeds back the feedback voltage Vfb, where the high-frequency components of a signal outputted from the rectifier circuit 22 have been removed, to the control circuit 30. Similar to the filter 18, the filter 24 may be configured by use of a resistor and a capacitor.

Based on the fed-back detection voltage Vdet and the feed-back voltage Vfb, the control circuit 30 controls the on and off of the first high-side transistor MH1, the first low-side transistor ML1, the second high-side transistor MH2 and the second low-side transistor ML2 in the H-bridge circuit 10. A switching voltage is supplied to the primary coil 12a of the transformer 12 by controlling the H-bridge circuit 10. As a result, energy is converted in the transformer 12 and then the first drive voltage Vdrv1 is supplied to the EEFL 210 connected with the secondary coil 12b.

Figure 3:
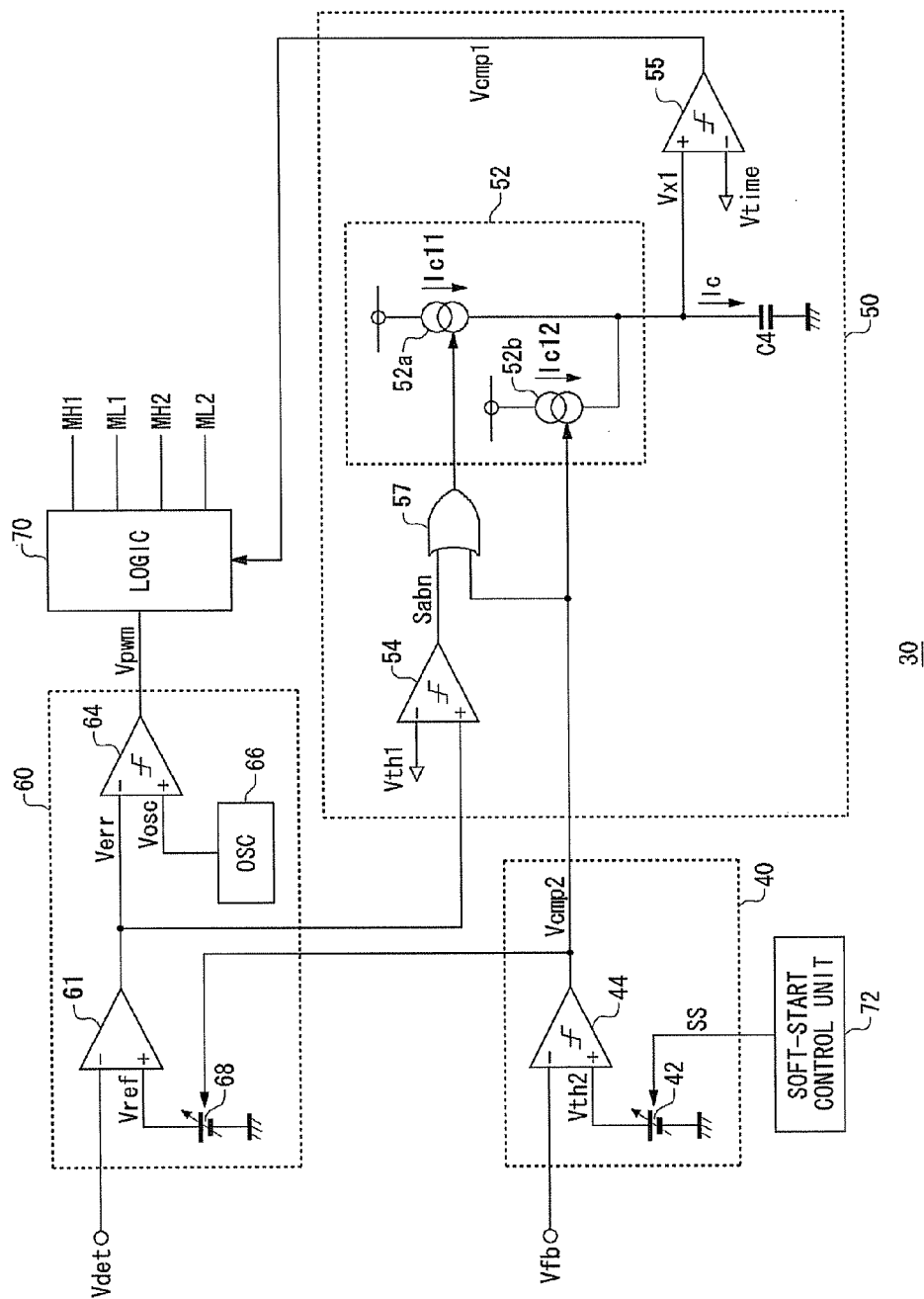
FIG. 3 is a circuit diagram showing a structure of a control circuit according to a first embodiment.

A structure of the control circuit 30 is described as follows.
FIG. 3 is a circuit diagram showing a structure of the control circuit 30 according to the first embodiment. The control circuit 30, which includes a pulse width modulator 60, a first protection circuit 50, a second protection circuit 40, a logic control unit 70 and a soft-start control unit 72, is a function IC integrated on a single semiconductor substrate. The control circuit 30 performs switching control of the transformer 12 in the inverter 100 by turning on and off the transistors in the H-bridge circuit 10 connected externally to the control circuit 30.

The pulse width modulator 60 generates a pulse-width-modulation signal whose duty ratio is feedback-controlled so that the detection voltage Vdet corresponding to the current across the secondary coil 12b of the transformer 12, namely the current flowing through the EEFL 210, is brought close to the reference voltage Vref. The pulse width modulator 60 includes an error amplifier 61, a pulse-width-modulation comparator (hereinafter referred to as PWM comparator) 64, a triangular wave signal generator 66, and a voltage source 68.

The voltage source 68 generates the reference voltage Vref. The voltage source 68 generates the reference voltage Vref determined according to the light emission luminance of the EEFL 210. The detection voltage Vdet which has been fed back from the current-voltage conversion unit 14 is inputted to an inverting input terminal of the error amplifier 61, whereas the reference voltage Vref outputted from the voltage source 68 is inputted to a noninverting input terminal thereof. The error amplifier 61 outputs an error voltage Verr according to error between the detection voltage Vdet and the reference voltage Vref. Note that the reference voltage Vref may be inputted from outside.

The triangular wave signal generator 66 generates a triangular wave signal Vosc of a triangular wave shape having a predetermined frequency. The PWM comparator 64 compares the error voltage Verr outputted from the error amplifier 61 with the triangular wave signal Vosc outputted from the triangular wave signal generator 66, and generates a pulse signal that goes to a high level when Verr<Vosc and goes to a low level when Verr>Vosc. This pulse signal is a pulse-width-modulation signal whose duty ratio is feedback-controlled so that the detection voltage Vdet is brought close to the reference voltage Vref. Hereinafter, this pulse signal will be referred to as PWM signal Vpwm. The PWM signal Vpwm is inputted to the logic control unit 70.

Based on a duty ratio of the PWM signal Vpwm, the logic control unit 70 controls the on and off of the first high-side transistor MH1, the first low-side transistor ML1, the second high-side transistor MH2 and the second low-side transistor ML2 of the H-bridge circuit 10. When the H-bridge circuit 10 is switching-controlled, the input voltage Vin which is DC voltage is converted into AC voltage and then outputted as a drive voltage Vdrv.

The first protection circuit 50 detects circuit error of the inverter 100, and stops the switching control of the inverter 100 when the circuit error continues for a predetermined duration of error detection time Ta. In the present embodiment, the first protection circuit 50 monitors the error voltage Verr outputted from the error amplifier 61 and detects circuit failures and errors such as the non-lighting of the EEFL 210. An error detection means in the first protection circuit 50 is not limited thereto, and it is only necessary that a state, where the inverter deviates from the stable operation, such as overvoltage of output voltage, overcurrent of output current or overheating errors can be detected.

Though a detailed description will be given later, the second protection circuit 40 monitors the feedback voltage Vfb according to the output voltage Vdrv of the inverter 100 and detects a state where the amplitude of the output voltage Vdrv is lower than a predetermined value. Such a state is caused by the ground fault in the output terminal 104 of the inverter 100. The second protection circuit 40 outputs a second comparison signal Vcmp2 that goes to a high level when a ground-short state is detected.

A structure of the first protection circuit 50 and the second protection circuit 40 will be described hereunder in sequence.

The first protection circuit 50 includes an error detection comparator 54, a current source 52, a first comparator 55, an OR gate 57, and a fourth capacitor C4. The error detection comparator 54 detects a circuit failure by comparing the error voltage Verr outputted from the error amplifier 61 with a predetermined threshold voltage Vth1, and outputs an abnormality detection signal Sabn of a high level during a period in which the failure occurs.

One end of the fourth capacitor C4 is grounded. The current source 52 generates a charging current Ic capable of being switched by two values thereof which are large and small, respectively, and charges the fourth capacitor C4 therewith. The current source 52 includes a first current source 52a which generates a first charging current Ic11, and a second current source 52b which generates a second charging current Ic12. The abnormality detection signal Sabn and the second comparison signal Vcmp2 are inputted to the first current source 52a via the OR gate 57. During a period in which at least one of the abnormality detection signal Sabn and the second comparison signal Vcmp2 is at a high level, the first current source 52a becomes active and generates the first charging current Ic11. During a period in which the second comparison signal Vcmp2 outputted from the second protection circuit 40 described later is at a high level, the second current source 52b becomes active and generates the second charging current Ic12. For example, the second charging current Ic12 is set to about 10 times the first charging current Ic11. The current source 52 controls the value of the charging current Ic by switching the active and inactive states of the first current source 52a and the second current source 52b.

The first comparator 55 compares a voltage Vx1 appearing across the fourth capacitor C4 with a voltage (hereinafter referred to as threshold voltage Vtime) which is set according to the error detection time Ta. The first comparator 55 outputs a first comparison signal Vcmp1 that goes to a high level when Vx1>Vtime and goes to a low level when Vx1<Vtime.

The current source 52, the first comparator 55 and the fourth capacitor C4 in the first protection circuit 50 constitute a timer. After the abnormality detection signal Sabn outputted from the error detection comparator 54 goes to a high level and then a predetermined duration of error detection time Ta has elapsed, the first comparison signal Vcmp1 goes to a high level. The error detection time Ta is given by Ta=Vtime×C4/Ic where C4 is a capacitance value of the fourth capacitor C4 and Ic is a value of current flowing through the fourth capacitor C4.

When the first current source 52a only becomes active, that is, when a circuit failure is detected by the first protection circuit 50, the current flowing into the fourth capacitor C4 is equal to Ic11 and therefore the error detection time Ta1 is Ta1=Vtime×C4/Ic11. On the other hand, when a short is detected by the second protection circuit 40, the second current source 52b becomes active. Thus the current flowing into the fourth capacitor C4 is Ic=Ic11+Ic12 and the error detection time Ta2 is Ta2=Vtime×C4/(Ic11+Ic12). As described above, if the second charging current Ic12 is set to about 10 times the first charging current Ic11, the error detection time Ta2 at the time of short-circuiting will be set to about 1/10 of the error detection time Ta1 with no short-circuiting. After a failure was detected and then the error detection time Ta has elapsed, the first comparison signal Vcmp1 goes to a high level. In the control circuit 30 according to the present embodiment, the first protection circuit 50 detects a non-lighting state of the EEFL 210 as a circuit error, and sets the first comparison signal Vcmp1 to a high level at the time of non-lighting.

The first comparison signal Vcmp1 generated by the first protection circuit 50 is outputted to the logic control unit 70. As the first comparison signal Vcmp1 goes to a high level, the logic control unit 70 stops the switching operation of the H-bridge circuit 10.

Next, a description will be given of a structure of the second protection circuit 40. The second protection circuit 40 includes a voltage source 42 and a second comparator 44. The voltage source 42 generates a predetermined threshold voltage (hereinafter referred to as short detection threshold voltage Vth2). The second comparator 44 compares the feedback voltage Vfb with the short detection threshold voltage Vth2 generated by the voltage source 42, and outputs a second comparison signal Vcmp2 that goes to a high level when Vfb<Vth2 and goes to a low level when Vfb<Vth2. For example, when the output terminal 104 of the inverter 100 is ground shorted, the second comparison signal Vcmp2 generated as above goes to a high level. This second comparison signal Vcmp2 is outputted to the pulse width modulator 60.

As the second comparison signal Vcmp2 goes to a high level, the voltage source 68 in the pulse width modulator 60 lowers the reference voltage Vref. For example, when the second comparison signal Vcmp2 is at a high level, the voltage source 68 sets the reference voltage Vref to about 1/4 of that for the normal time. In this manner, the second protection circuit 40 monitors the feedback voltage Vfb according to the output voltage Vdrv of the inverter 100, and lowers the reference voltage Vref generated by the voltage source 68 of the pulse width modulator 60 when the feedback voltage Vfb falls below the short detection threshold voltage Vth2.

The second comparison signal Vcmp2 outputted from the second comparator 44 is outputted to the current source 52 in the first protection circuit 50. As described above, when the second comparison signal Vcmp2 goes to a high level, that is, when a short is detected, the second current source 52b becomes active and the charging current for the fourth capacitor C4 in the first protection circuit 50 increases, thereby setting the error detection time Ta of the first protection circuit 50 shorter.

The soft-start control unit 72 is a block which controls a soft-start by which the output voltage Vdrv of the inverter 100 is gradually raised. The soft-start control unit 72 outputs a soft-start control signal SS to the voltage source 42 of the second protection circuit 40. This soft-start signal SS is a signal, for example, which goes to a high level in a start-up period started from when the inverter 100 is started by the control circuit 30 and then goes to a low level. The soft-start control unit 72 may set a predetermined duration of time after a start of the inverter 100, to a start-up period. Or the soft-start control unit 72 may set a period until when a soft-start voltage of a lamp waveform for controlling the soft-start reaches a predetermined potential, to the start-up period.

During a period of which the soft-start control signal SS is at a high level, the voltage source 42 sets the short detection threshold voltage Vth2 to a first voltage value Vth2a. During a low-level period, the voltage source 42 sets the short detection threshold voltage Vth2 to a second voltage value Vth2b which is higher than the first voltage value Vth2a. That is, during a start-up period after the control circuit 30 is started, the short detection threshold voltage Vth2 outputted from the voltage source 42 is set lower than that at the normal operating time after the start-up period has elapsed.

An operation of the inverter 100 structured as above is now described. FIGS. 4A to 4E and FIGS. 5A to 5E are timing charts showing operating states of the inverter 100 according to the present embodiment at the time when a load is short-circuited. The vertical axis and the horizontal axis in these timing charts are enlarged or reduced as appropriate for the simplicity of explanation.

Figure 4:
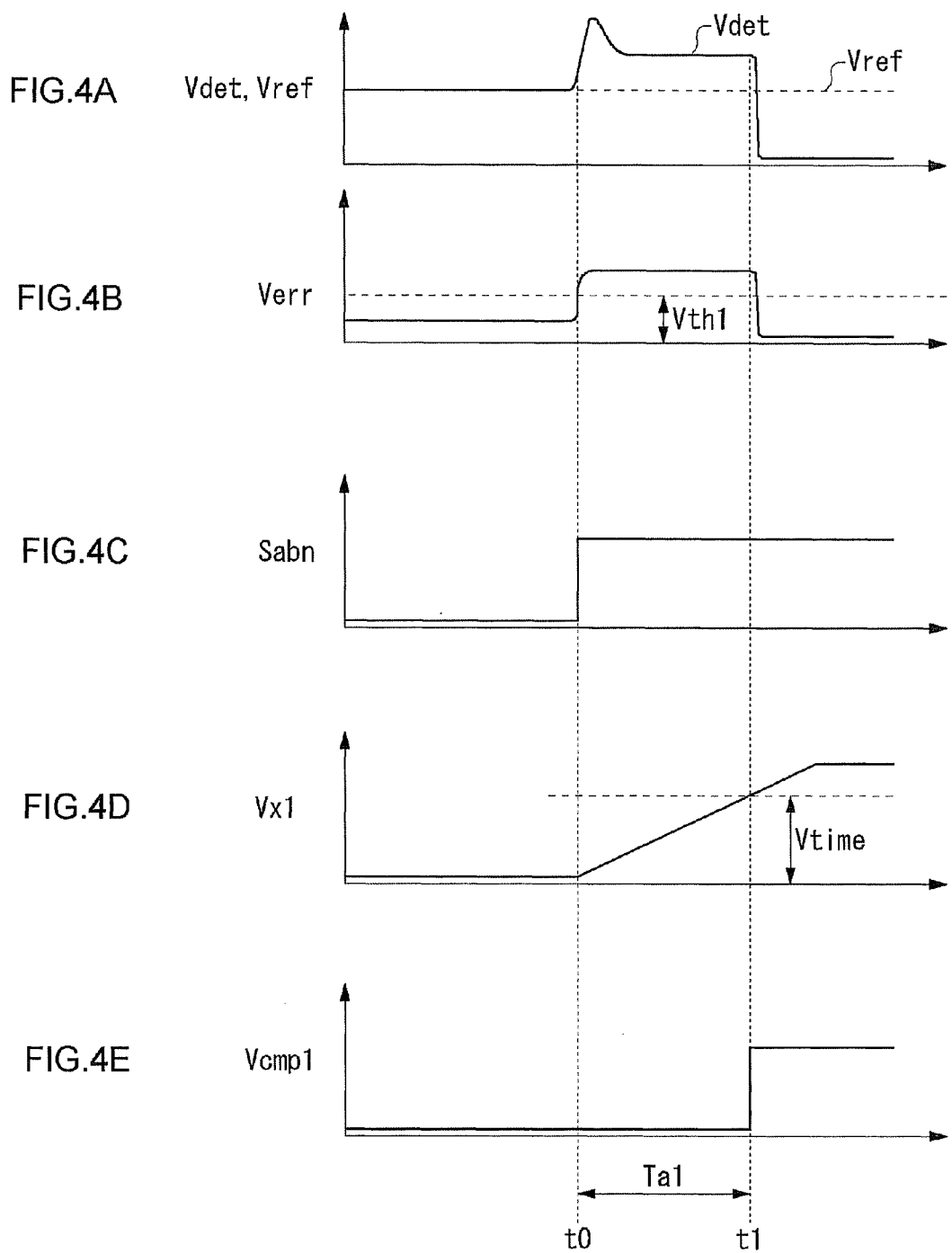
FIGS. 4A to 4E are timing charts showing operating states of an inverter of FIG. 1 with no ground-short.

Using FIGS. 4A to 4E, a description is first given of a case where no ground short is detected. FIG. 4A shows the detection voltage Vdet and the reference voltage Vref; FIG. 4B shows the error voltage Verr; FIG. 4C shows the abnormality detection signal Sabn; FIG. 4D shows the voltage Vx1 across the fourth capacitor C4; and FIG. 4E shows the first comparison signal Vcmp1.

Prior to time t0, the detection voltage Vdet is stabilized at the reference voltage Vref and the EEFL 210 emits light at predetermined luminance. At this time, the error voltage Verr takes a steady value which is lower than the error detection threshold voltage Vth1. Thus, prior to time t0, the abnormality detection signal Sabn is at a low level, the first current source 52a is set to an inactive state, and the voltage Vx1 across the fourth capacitor C4 is 0 V.

As the current flowing through the EEFL 210 varies and the current across the secondary coil 12b of the transformer 12 varies at time t0, the detection voltage Vdet also varies together with the variation in the current. At this time, the error voltage Verr obtained by amplifying the error between the detection voltage Vdet and the reference voltage Vref rises also and eventually rises above the error detection threshold voltage Vth1. As a result, the abnormality detection signal Sabn goes to a high level at time t0.

As the abnormality detection signal Sabn goes to the high level at time t0, the first current source 52a becomes active to start the charging of the fourth capacitor C4 and thereby the voltage Vx1 appearing across the fourth capacitor C4 starts rising. Thereafter, as the voltage Vx1 appearing across the fourth capacitor C4 becomes higher than the threshold voltage Vtime at time t1 after the error detection time Ta1 has elapsed, the first comparison signal Vcmp1 goes to a high level.

As the first comparison signal Vcmp1 goes to a high level at time t1, the logic control unit 70 stops the switching control of the H-bridge circuit 10. When the switching control of the H-bridge circuit 10 is stopped, the current flowing through the secondary coil 12b drops and the detection voltage Vdet also drops down to 0 V.

In this manner, when the circuit failure is detected by the first protection circuit 50 at the time when no ground-short occurs, the inverter 100 according to the present embodiment stops the inverter 100 after a predetermined error detection time Ta1 has elapsed, and then executes circuit protection.

Figure 5:
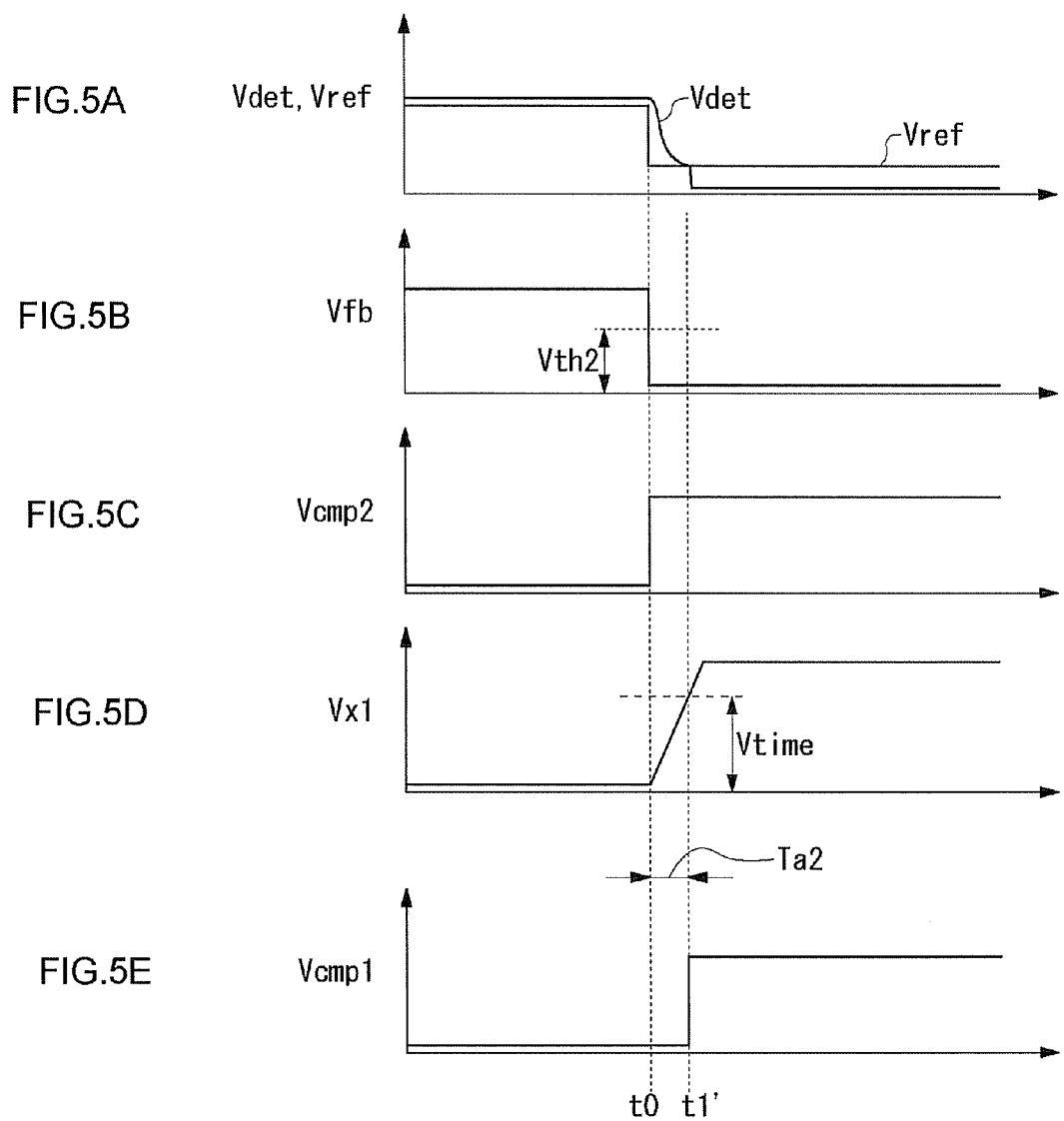
FIGS. 5A to 5E are timing charts showing operating states of an inverter of FIG. 1 at the time of ground-short.

Referring to FIGS. 5A to 5E, a description is next given of the circuit protection at the time when ground short occurs. FIG. 5A shows the detection voltage Vdet and the reference voltage Vref; FIG. 5B shows the feedback voltage Vfb; FIG. 5C shows the second comparison signal Vcmp2; FIG. 5D shows the voltage Vx1 across the fourth capacitor C4; and FIG. 5E shows the first comparison signal Vcmp1.

At time t0, the output terminal 104 of the inverter 100 is ground-shorted. As the output terminal 104 is ground-shorted, two current paths leading to the ground are formed separately from the path leading to the EEFL 210. As a result, the current across the secondary coil 12b of the transformer increases.

When the output terminal 104 is ground-shorted at time t0, the drive voltage Vdrv appearing at the output terminal 104 gets smaller in amplitude and the feedback voltage Vfb according to the drive voltage Vdrv drops down to near 0 V. When the feedback voltage Vfb becomes lower than the short detection threshold voltage Vth2 at time t0, the second comparison signal Vcmp2 goes to a high level.

As the second comparison signal Vcmp2 goes to a high level at time t0, the first current source 52a becomes active and at the same time the second current source 52b becomes active. Thus the charging current Ic for the fourth capacitor C4 becomes Ic11+Ic12. As a result, the voltage Vx1 across the fourth capacitor C4 rises faster than in the case of FIG. 4D. At time t1' when the error detection time Ta2 has elapsed from time t0, the first comparison signal Vcmp1 goes to a high level and the inverter 100 stops. When the inverter 100 stops, the current flowing through the secondary coil 12b drops and the detection voltage Vdet also drops down to 0 V.

In this manner, as it detects the ground-short, the control circuit 30 according to the present embodiment sets the error detection time Ta short and stops the inverter 100 in a shorter duration of time than with no ground-short, so as to protect the circuitry.

With the second comparison signal Vcmp2 going to a high level at time t0, the reference voltage Vref generated by the voltage source 68 in the pulse width modulator 60 drops. As a result, the circuit protection is activated so that the detection voltage Vdet is brought close to the reduced reference voltage Vref, that is, the current flowing through the secondary coil 12b of the transformer 12 decreases.

In this manner, according to the control circuit 30 employed in the present embodiment, at the time of ground-short the reference voltage Vref is set lower than that at normal operating time. Thereby, the output of the inverter 100 is reduced during a period until when the inverter 100 is stopped, and the current flowing through a ground-short path is reduced. At the same time, the power consumed by the circuit can be suppressed, and the protection of the inverter 100 and a set equipped with the inverter 100 can be strengthened.

Further, during a start-up period, the control circuit 30 according to the present embodiment lowers the short detection threshold voltage Vth2 generated by the voltage source 42. As a result, in the case of a soft-start that raises slowly the output voltage Vdrv after a start-up, a distinction can be made between a state where the output voltage Vdrv is low due to the short-circuiting and a state where the output voltage Vdrv is low due to the soft-start. Hence, the start-up period can be excluded from the circuit protection executed by the second protection circuit 40.

The above-described embodiment is merely exemplary, and it is understood by those skilled in the art that various modifications to the combination of each component and process thereof are possible and such modifications are also within the scope of the present invention.

In the embodiment, the first protection circuit 50 in the control circuit 30 monitors the error voltage Verr outputted from the error amplifier 61 to detect the non-lighting of the EEFL 210 but the present invention is not limited thereto. The first protection circuit 50 may monitor the voltage Vfb according to the output voltage Vdrv and determine the EEFL 210 to be unlit when this voltage exceeds a threshold voltage.

In the present embodiment, the components constituting the control circuit 30 may all be integrated in a single package, or part of them may be comprised of discrete components or chip components. Also, the control circuit 30 may be integrated by including the H-bridge circuit 10. Which of the components is to be integrated in what way may be determined in consideration of the specifications, the cost, the area to be occupied and the like of the inverter 100.

In the present embodiment, the high-level and low-level settings of logical values in a logic circuit are merely exemplary, and they can be changed freely by inverting them as appropriate by an inverter or the like.

In the present embodiment, the error detection time until the stoppage of the inverter is switched by switching the charging current Ic generated by the current source 52 in the first protection circuit 50 but this should not be considered as limiting. For example, the capacitance value of the fourth capacitor C4 may be switched or the threshold voltage Vtime may be switched for the switching of the error detection time. Also, the first protection circuit 50 may be constituted by use of a digital timer.

In the present embodiment, a description has been given of a case where in the light emitting device 200 two inverters 100 are connected to the EEFL 210 at both ends thereof and the EEFL 210 is driven by the voltages having mutually reversed phases. However, this should not be considered as limiting and, for example, a single inverter 100 may be used to drive the EEFL 210 whose voltage at one end thereof is fixed. Also, a fluorescent tube to be driven is not limited to the EEFL and may be other fluorescent tubes such as CCFL. Also, a load driven by the inverter 100 according to the present embodiment is not limited to the fluorescent tube and may be applied to the driving of other various devices that require AC high voltage, so that the circuit protection can be exercised.

Second Embodiment

Figure 6:
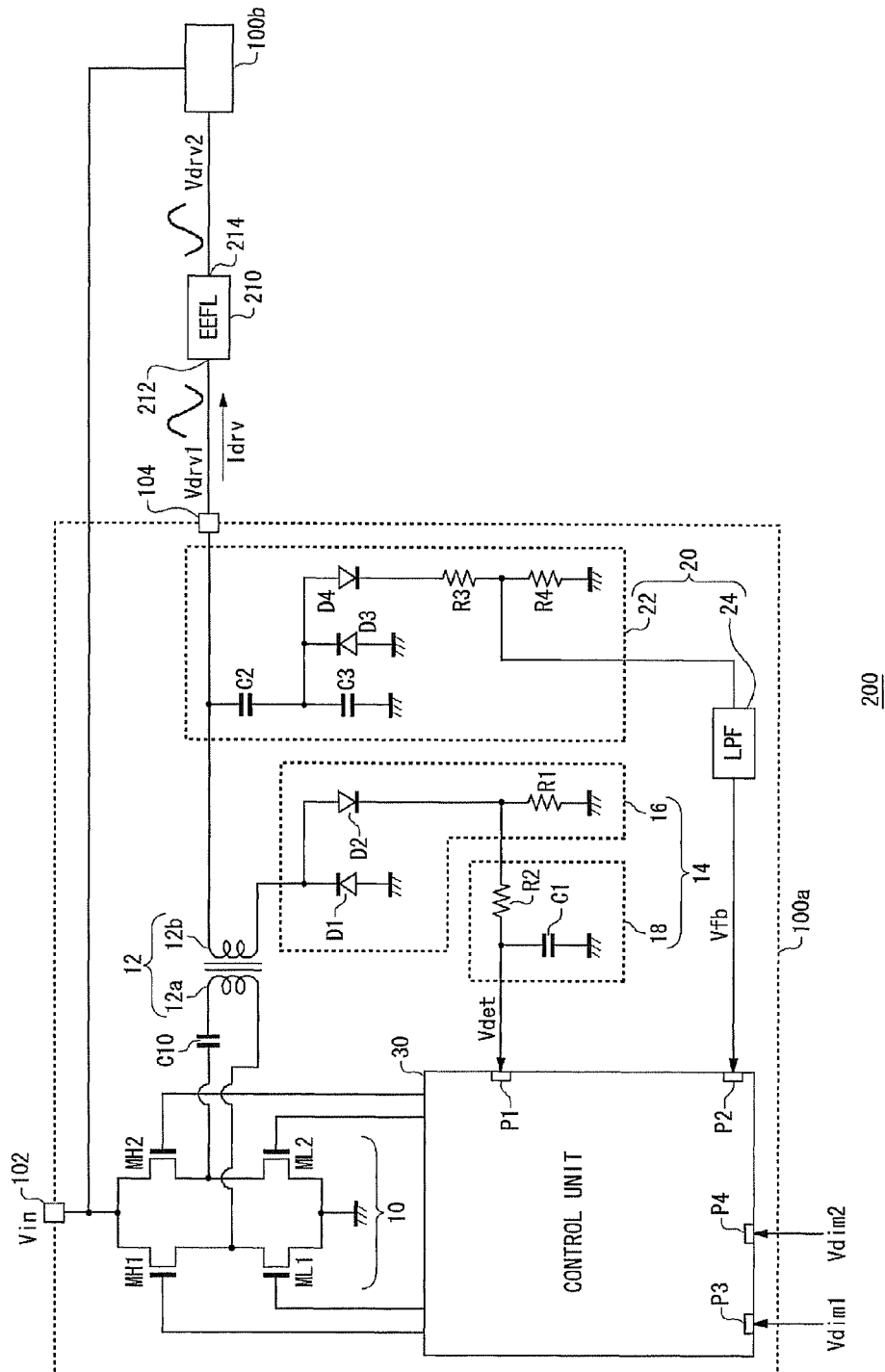
FIG. 6 is a circuit diagram showing a structure of a light emitting device according to a second embodiment.
Figure 7:
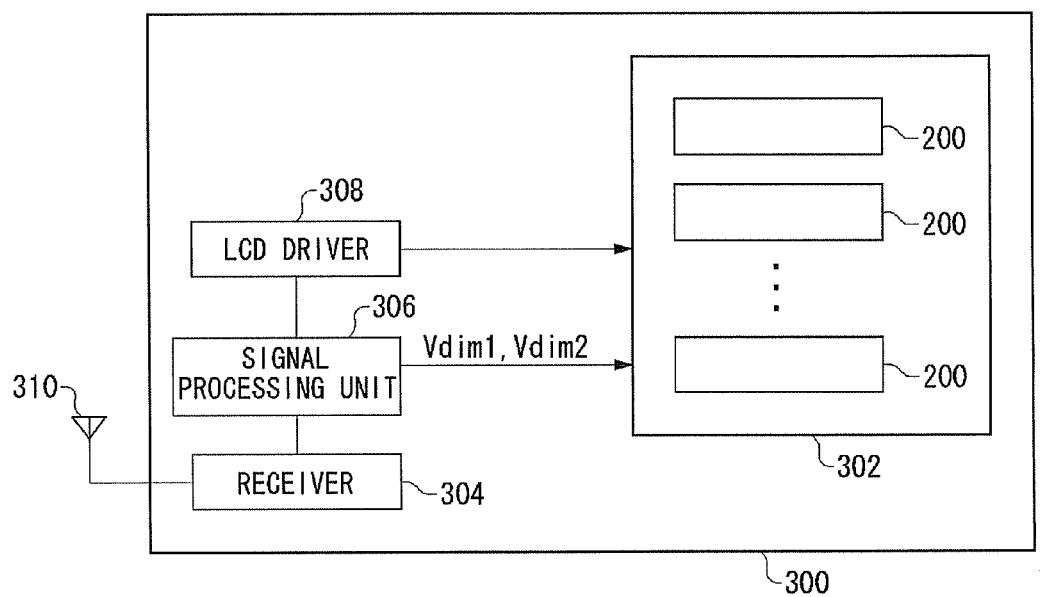
FIG. 7 is a block diagram showing a structure of an LCD television on which light emitting devices of FIG. 6 are mounted.

FIG. 6 is a circuit diagram showing a structure of a light emitting device 200 according to a second embodiment of the present invention. FIG. 7 is a block diagram showing a structure of an LCD television 300 on which the light emitting devices 200 of FIG. 6 are mounted. The LCD television 300 is connected to an antenna 310. The antenna 310 receives broadcast waves and outputs received signals to a receiver 304. The receiver 304 detects and amplifies the received signal so as to be outputted to a signal processing unit 306. The signal processing unit 306 outputs image data, acquired by demodulating the modulated data, to an LCD driver 308. The LCD driver 308 outputs the image data to an LCD panel 302 for each scanning line so as to display videos and images. On the backside of the LCD panel 302, a plurality of light emitting devices 200 are arranged as backlight. The signal processing unit 306 outputs two dimming control voltages Vdim1 and Vdim2 to control the operating state of the LCD television 300 or the light emission luminance of the light emitting device 200 according to a user operation.

The light emitting devices 200 of FIG. 6 according to the present embodiment can be suitably used as the backlight for such an LCD panel 302. Hereinbelow, referring back to FIG. 6, a detailed description will be given of a structure and an operation of the light emitting device 200.

The light emitting device 200 according to the present embodiment includes an EEFL 210, a first inverter 100a, and a second inverter 100b. The EEFL 210 is placed on the back surface of the LCD panel 302. The first inverter 100a and the second inverter 100b, which are each a DC/AC converter, convert an input voltage Vin, outputted from a DC power supply and inputted to an input terminal 102, into AC voltage and boost it so as to supply a first drive voltage Vdrv1 and a second drive voltage Vdrv2 to a first terminal 212 and a second terminal 214 of the EEFL 210, respectively. The first drive voltage Vdrv1 and the second drive voltage Vdrv2 are AC voltages having mutually reversed phases.

Though there is provided a single EEFL 210 in FIG. 6, a plurality of EEFLs may be arranged in parallel with one another. A description is given hereunder of a structure of the first inverter 100a and the second inverter 100b according to the present embodiment. The first inverter 100a and the second inverter 100b have a similar structure to each other. Thus no distinction will be made therebetween and they will be generically referred to as "inverter 100" in the following description.

The inverter 100 includes an H-bridge circuit 10, a transformer 12, a current-voltage conversion unit 14, a drive voltage detection unit 20, a control circuit 30, and a capacitor C10.

The H-bridge circuit 10 includes four power transistors which are a first high-side transistor MH1, a first low-side transistor ML1, a second high-side transistor MH2 and a second low-side transistor ML2.

One end of the first high-side transistor MH1 is connected to an input terminal 102 to which an input voltage is applied, whereas the other end thereof is connected to a first terminal of a primary coil 12a of the transformer 12. One end of the first low-side transistor ML1 is connected to a ground terminal where the potential thereof is fixed, whereas the other end thereof is connected to the first terminal of the primary coil 12a. One end of the second high-side transistor MH2 is connected to the input terminal 102, whereas the other end thereof is connected to a second terminal of the primary coil 12a via the DC-blocking capacitor C10. One end of the second low-side transistor ML2 is connected to the ground terminal, whereas the other end thereof is connected to the second terminal of the primary coil 12a via the DC-blocking capacitor C10.

The current-voltage conversion unit 14 is provided on a current path of the secondary coil 12b of the transformer 12. The current-voltage conversion unit 14 converts the current flowing through the secondary coil 12b, namely the current flowing through the EEFL 210, into a voltage so as to output it as a detection voltage Vdet. The current-voltage conversion unit 14 includes a rectifier circuit 16 and a filter 18.

The rectifier circuit 16 includes a first diode D1, a second diode D2, and a first resistor R1. An anode of the first diode D1 is grounded, whereas a cathode thereof is connected to one end of the secondary coil 12b. An anode of the second diode D2 is connected with the cathode of the first diode D1. The first resistor R1 is provided between a cathode of the second diode D2 and ground. The AC current flowing through the secondary coil 12b is half-wave rectified by the first diode D1 and the second diode D2 so as to flow through the first resistor R1. A voltage drop which is proportional to the current flowing through the secondary coil 12b occurs across the first resistor R1. The rectifier circuit 16 outputs the voltage drop across the first resistor R1.

The filter 18 is a low-pass filer that includes a second resistor R2 and a first capacitor C1. The filter 18 feeds back the detection voltage Vdet, where high-frequency components have been removed, to the control circuit 30.

The drive voltage detection unit 20, which is provided between an output terminal 104 of the inverter 100 and ground, is configured by including a rectifier circuit 22 and a filter 24. The drive voltage detection unit 20 generates a DC feedback voltage Vfb according to a drive voltage Vdrv outputted from the inverter 100 and then feeds it back to the control circuit 30.

The rectifier circuit 22 includes a second capacitor C2, a third capacitor C3, a third diode D3, a fourth diode D4, a third resistor R3, and a fourth resistor R4. The second capacitor C2 and the third capacitor C3 are connected in series between the output terminal 104 and ground. An anode of the third diode D3 is grounded, whereas a cathode thereof is connected with a connection point of the second capacitor C2 and the third capacitor C3. An anode of the fourth diode D4 is connected to the cathode of the third diode D3. The third resistor R3 and the fourth resistor R4 are connected in series between a cathode of the fourth diode D4 and ground. The drive voltage Vdrv outputted from the output terminal 104, which is AC voltage, is voltage-divided by the second capacitor C2 and the third capacitor C3. The divided drive voltage Vdrv is half-wave rectified by the third diode D3 and the fourth diode D4 and is then further voltage-divided by the third resistor R3 and the fourth resistor R4. The drive voltage divided by the third resistor R3 and the fourth resistor R4 is outputted to the filter 24.

The filter 24 feeds back the feedback voltage Vfb, where the high-frequency components of a signal outputted from the rectifier circuit 22 have been removed, to the control circuit 30. Similar to the filter 18, the filter 24 may be configured by use of a resistor and a capacitor.

Based on the fed-back detection voltage Vdet and the feedback voltage Vfb, the control circuit 30 controls the on and off of the first high-side transistor MH1, the first low-side transistor ML1, the second high-side transistor MH2 and the second low-side transistor ML2 in the H-bridge circuit 10. A switching voltage is supplied to the primary coil 12a of the transformer 12 by controlling the H-bridge circuit 10. As a result, energy is converted in the transformer 12 and then the first drive voltage Vdrv1 is supplied to the EEFL 210 connected with the secondary coil 12b.

Figure 8:
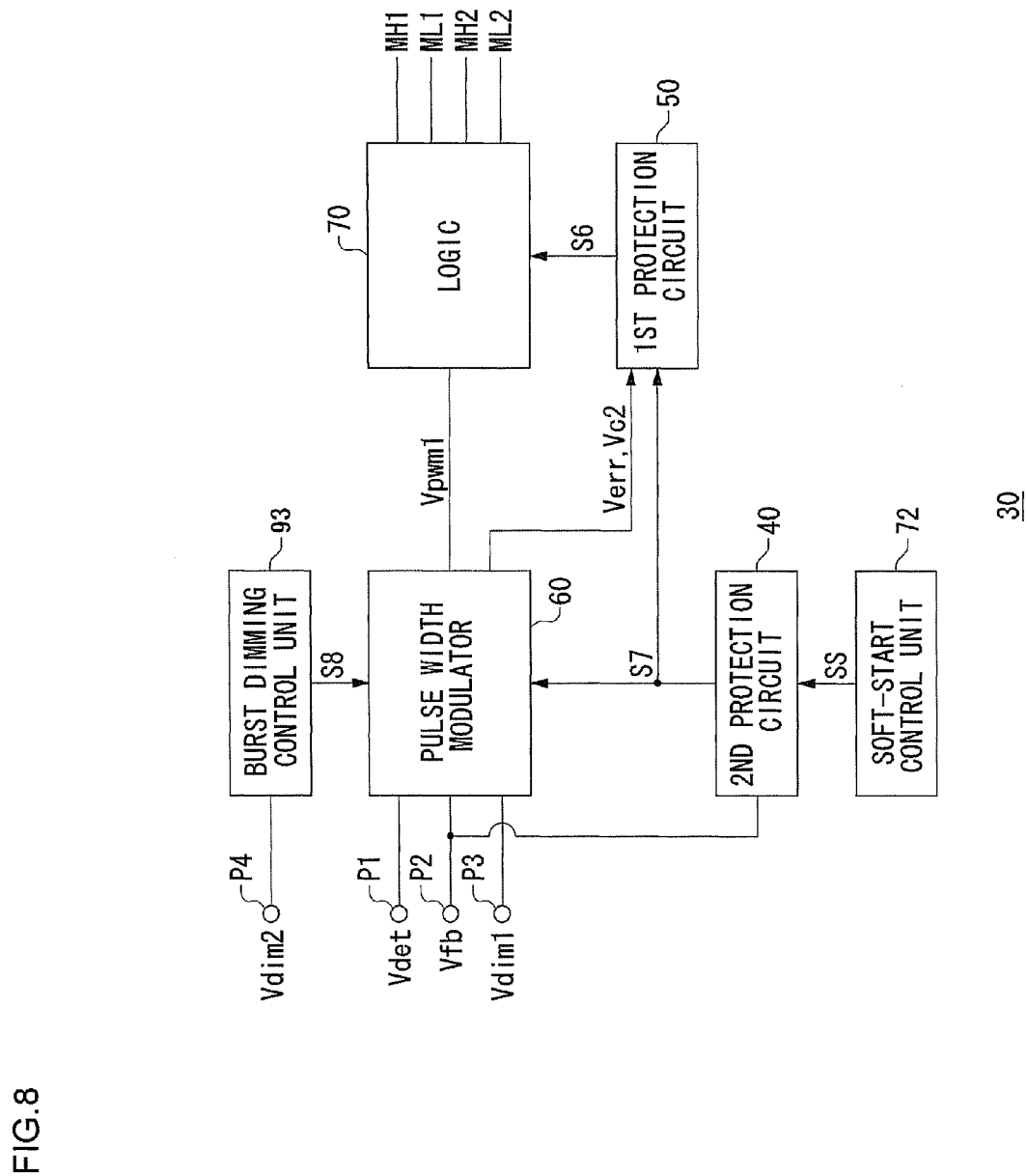
FIG. 8 is a circuit diagram showing a structure of a control circuit according to a second embodiment.

A structure of the control circuit 30 is described as follows. The control circuit 30 performs a switching control of the transformer 12 in the inverter 100 by turning on and off the transistors in the H-bridge circuit 10 connected externally to the control circuit 30. FIG. 8 is a circuit diagram showing a structure of the control circuit 30 according to the second embodiment. A brief overview of the operation of the entire control circuit 30 is first described based on this block diagram. The control circuit 30, which includes a pulse width modulator 60, a first protection circuit 50, a second protection circuit 40, a logic control unit 70, a soft-start control unit 72 and a burst dimming control unit 93, is a function IC integrated on a single semiconductor substrate.

The control circuit 30 is provided with input terminals P1 to P4. The detection voltage Vdet is inputted to the first input terminal P1; the feedback voltage Vfb is inputted to the second input terminal P2; the analog dimming control voltage Vdim1 is inputted to third input terminal P3; and the burst dimming control voltage Vdim2 is inputted to the fourth input terminal P4.

The current flowing through the EEFL 210 to be driven is feedback-controlled based on the analog dimming control voltage Vdim1 inputted to the third input terminal P3 from the outside, so as to adjust the luminance of the EEFL 210 to be driven. The control circuit 30 controls the effective light emission luminance of the EEFL 210 in a manner such that the EEFL 210 emits light intermittently based on the burst dimming control voltage Vdim2 inputted to the fourth input terminal P4.

At start-up of the inverter 100 before the EEFL 210 emits light, the pulse width modulator 60 stabilizes the drive voltage Vdrv, based on the feedback voltage Vfb. When a predetermined drive voltage Vdrv is supplied to the EEFL 210 which then emits light, the lamp starts to discharge and therefore the drive voltage Vdrv drops. When the EEFL 210 emits light, the pulse width modulator 60 stabilizes a drive current Idrv flowing through the lamp based on the detection voltage Vdet according to the current flowing through the lamp, and has the lamp emit light at predetermined luminance. The pulse width modulator 60 generates a pulse-width-modulation (PWM) signal Vpwm1 whose duty ratio varies by a feedback.

The first protection circuit 50 is a block that protects the circuitry by detecting circuit failures in the inverter 100. The first protection circuit 50 outputs a switching stop signal S6 to the logic control unit 70. The switching stop signal S6 is a signal that goes to a high level when a circuit error continues for a predetermined error detection time Ta.

Based on the duty ratio of the PWM signal Vpwm1, the logic control unit 70 controls the on and off of the first high-side transistor MH1, the first low-side transistor ML1, the second high-side transistor MH2 and the second low-side transistor ML2 in the H-bridge circuit 10. After the H-bridge circuit 10 has been switching-controlled, the input voltage Vin which is DC voltage is converted into AC voltage and then outputted as a drive voltage Vdrv. When the switching stop signal S6 goes to a high level, the logic control unit 70 stops the switching of the transistors in the H-bridge circuit 10.

The second protection circuit 40 monitors the feedback voltage Vfb according to the output voltage Vdrv of the inverter 100 and detects a state where the amplitude of the output voltage Vdrv is lower than a predetermined value. Such a state is caused by the ground fault in the output terminal 104 of the inverter 100. The second protection circuit 40 outputs a short detection signal S7 which goes to a high level when error like a ground-short is detected. When the high-level short detection signal S7 is inputted, the first protection circuit 50 sets the aforementioned error detection period Ta shorter, then starts measuring the time and reduces the time until the stop of the switching. As a result, the circuitry protection is strengthened. When the high-level short detection signal S7 is inputted, the pulse width modulator 60 strengthens the circuitry protection by effecting a feedback in a direction that the detection voltage Vdet drops, namely in a direction that the drive current Idrv flowing through the EEFL 210 drops.

The soft-start control unit 72 is a block which controls a soft-start by gradually raising the output voltage Vdrv of the inverter 100. The soft-start control unit 72 outputs a soft-start control signal SS to the voltage source 42 of the second protection circuit 40. This soft-start signal SS is a signal, for example, which goes to a high level during a start-up period started from when the inverter 100 is started by the control circuit 30 and then goes to a low level. The soft-start control unit 72 may set a predetermined duration of time after a start of the inverter 100, to the start-up period. Or the soft-start control unit 72 may set a period until when a soft-start voltage of a lamp waveform for controlling the soft-start reaches a predetermined potential, to the start-up period. During a period of which the soft-start control signal is at a high level, the second protection circuit 40 lowers a threshold voltage to be compared with the feedback voltage Vfb.

The burst dimming control unit 93 is a block which controls the effective light emission luminance of the EEFL 210 by intermittently stopping the light emission of the EEFL 210 based on the burst dimming control voltage Vdim2. The burst dimming control unit 93 outputs a pulse-width-modulated burst signal S8 to the pulse width modulator 60. The pulse width modulator 60 refers to the burst signal S8. If the stop of light emission is specified, the pulse width modulator 60 fixes the PWM signal Vpwm1 to a high level or low level.

A structure of each circuit block is hereinbelow described in detail.

Figure 9:
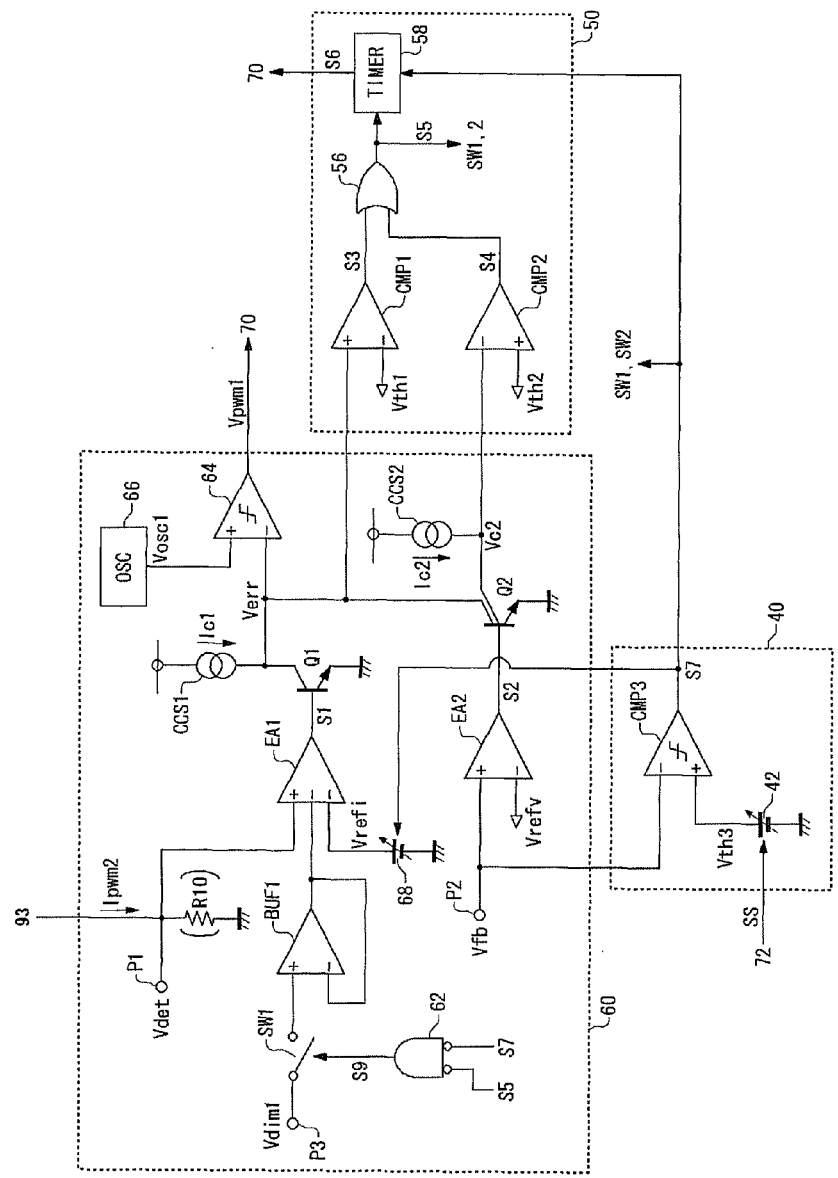
FIG. 9 is a circuit diagram showing a structure of a pulse width modulator, a first protection circuit and a second protection circuit.

FIG. 9 is a circuit diagram showing a structure of a pulse width modulator 60, a first protection circuit 50 and a second protection circuit 40.

The pulse width modulator 60 includes a first constant current source CCS1, a second constant current source CCS2, a first error amplifier EA1, a second error amplifier EA2, a first bipolar transistor Q1, a second bipolar transistor Q2, an AND gate 62, a PWM comparator 64, a triangular wave signal generator 66, a voltage source 68, an analog dimming stop switch SW1, and a buffer BUF1.

The voltage source 68 generates a reference voltage Vrefi that sets an upper limit of current flowing through the EEFL 210. The first error amplifier EA1 is provided with two inverting input terminals. To one of the two inverting input terminals the reference voltage Vrefi outputted from the voltage source 68 is inputted. To the other thereof an analog dimming control voltage Vdim1 is inputted. The detection voltage Vdet fed back from the current-voltage conversion unit 14 is inputted to a noninverting input terminal of the first error amplifier EA1. The first error amplifier EA1 amplifies error between the analog dimming control voltage Vdim1 or the reference voltage Vrefi, whichever is lower, and the detection voltage Vdet.

An output signal S1 of the first error amplifier EA1 is inputted to a base of the first bipolar transistor Q1 whose emitter is grounded. The first constant current source CCS1 that generates a constant current Ic1 is connected to a collector of the first bipolar transistor Q1.

On the other hand, a reference voltage Vrefv is inputted to an inverting input terminal of the second error amplifier EA2, whereas the feedback voltage Vfb is inputted to a noninverting input terminal thereof. The second error amplifier EA2 amplifies error between the reference voltage Vrefv and the feedback voltage Vfb.

An output signal S2 of the second error amplifier EA2 is inputted to a base of the second bipolar transistor Q2 whose emitter is grounded. The second bipolar transistor Q2 is a double-collector NPN type bipolar transistor wherein one collector is connected to the first constant current source CCS1 and the other collector is connected to the second constant current source CCS that generates a second constant current Ic2.

A voltage appearing at a connection point of the first constant current source CCS1 and the collectors of the first bipolar transistor Q1 and the second bipolar transistor Q2 (hereinafter this voltage will be referred to as error voltage Verr) is inputted to an inverting input terminal of the PWM comparator 64.

Here, before the EEFL 210 emits light, no current flows through the EEFL 210, that is, no current flows through the secondary coil 12b of the transformer 12, and the detection voltage Vdet drops, so that error between the detection voltage Vdet and the reference voltage Vrefi gets larger. As a result, the signal S1 drops and the first bipolar transistor Q1 turns off. During this time, the constant current Ic1 generated by the first constant current source CCS1 flows through the second bipolar transistor Q2. As a result, the error voltage Verr is generated by the second error amplifier EA2 and the second bipolar transistor Q2, and a feedback is provided so that the feedback voltage Vfb is brought close to the reference voltage Vrefv.

As the EEFL 210 emits light and the drive current Idrv flows, the drive voltage Vdrv drops. As a result, the feedback voltage Vfb drops and the error between the feedback voltage Vfb and the reference voltage Vrefv becomes larger. Therefore the signal S2 drops, and the second bipolar transistor Q2 turns off. After the EEFL 210 emits light and the drive current Idrv flows, the detection voltage Vdet rises and is brought close to the reference voltage Vrefi. As a result, the signal S1 rises and the first bipolar transistor Q1 turns on. That is, when the EEFL 210 emits light, the error voltage Verr is generated by the first error amplifier EA1 and the first bipolar transistor Q1. Then a feedback is provided so that the detection voltage Vdet is brought close to the reference voltage Vrefi.

The triangular wave signal generator 66 generates a triangular wave signal Vosc1 of a triangular wave shape having a predetermined frequency. The PWM comparator 64 compares the error voltage Verr with the triangular wave signal Vosc1 outputted from the triangular wave signal generator 66, and outputs a PWM signal Vpwm1 that goes to a high level when Verr<Vosc1 and that goes to a low level when Verr>Vosc1.

During a period when the EEFL 210 emits light, the duty ratio of the PWM signal Vpwm is feedback-controlled so that the detection voltage Vdet is brought close to the analog dimming control voltage Vdim1 or the reference voltage Vrefi whichever is lower. On the other hand, when the EEFL 210 does not emit light, it is feedback-controlled so that the feedback voltage Vfb is brought close to the reference voltage Vrefv.

In the pulse width modulator 60, the voltage source 68 is a variable voltage source. When the short detection signal S7 outputted from the second protection circuit 40 goes to a high level, the voltage source 68 lowers the reference voltage Vrefi. For example, when the short detection signal S7 is at a high level, the voltage source 68 sets the reference voltage Vrefi to about ¼ of that for the normal time.

The analog dimming stop switch SW1 and the buffer BUF1 are provided between the third terminal P3, to which the analog dimming control voltage Vdim1 is inputted, and the inverting input terminal of the first error amplifier EA1. The on and off of the analog dimming stop switch SW1 is controlled based on the output of the AND gate 62. The short detection signal S7 outputted from the second protection circuit 40 is logically inverted and then inputted to one input terminal of the AND gate 62. The abnormality detection signal S5, which is outputted from the first protection circuit 50 and goes to a high level when a circuit failure occurs, is inverted and then inputted to the other input terminal of the AND gate 62. The analog dimming stop switch SW1 turns on when an output signal S9 of the soft-start control unit 72 goes to a high level; and the analog dimming stop switch SW1 turns off when it goes to a low level.

The first protection circuit 50 includes a first error detection comparator CMP1, a second error detection comparator CMP2, an OR gate 56 and a timer circuit 58. The first error detection comparator CMP1 compares the error voltage Verr with a threshold voltage Vth1, and outputs an abnormality detection signal S3 that goes to a high level when Verr>Vth1. When the detection voltage is not stabilized to the reference voltage Vrefi and the feedback voltage Vfb is not stabilized to the reference voltage Vrefv, the abnormality detection signal S3 goes to a high level.

The second error detection comparator CMP2 compares a voltage Vc2 appearing at a connection point of the second constant current source CCS2 and the second bipolar transistor Q2 with a threshold voltage Vth2, and outputs an abnormality detection signal S4 that goes to a high level when Vc2<Vth2. The higher the feedback voltage Vfb, the lower the voltage Vc2 becomes. Thus, the abnormality detection signal S4 goes to a high level in an overvoltage state.

The OR gate 56 generates the logical sum of the two abnormality detection signals S3 and S4 and outputs it as an abnormality detection signal S5. The abnormality detection signal S4 goes to a high level not only when the circuit becomes overcurrent or overvoltage but also when the EEFL 210 does not emit light.

However, an error detection means in the first protection circuit 50 is not limited thereto, and it is only necessary that a state where the inverter deviates from the stable operation, such as overvoltage of output voltage, overcurrent of output current or overheating errors, can be detected.

The abnormality detection signal S5 is inputted to the timer circuit 58. The timer circuit 58 measures a period during which the abnormality detection signal S5 stays high, and outputs to the logic control unit 70 a switching stop signal S6 that goes to a high level when a predetermined error detection time Ta has elapsed. As the switching stop signal S6 goes to a high level, that is, as an error state of circuitry continues for a predetermined duration of time, the logic control unit 70 stops the switching operation of the H-bridge circuit 10.

The second protection circuit 40 includes a short detection comparator CMP3 and a voltage source 42. The voltage source 42 generates a predetermined threshold voltage (hereinafter referred to as short detection threshold voltage Vth3). The short detection comparator CMP3 compares the feedback voltage Vfb with the short detection threshold voltage Vth3 generated by the voltage source 42, and outputs a short detection signal S7 that goes to a high level when Vfb<Vth3 and goes to a low level when Vfb<Vth3. For example, when the output terminal 104 of the inverter 100 is ground shorted, the short detection signal S7 generated as above goes to a high level. It is to be noted that the feedback voltage Vfb monitored by the second protection circuit 40 may be a voltage proportional to the feedback voltage Vfb inputted to the second error amplifier EA2.

The short detection signal S7 is outputted to the first protection circuit 50 and the pulse width modulator 60, and is also used for the on-off switching of an analog dimming stop switch SW1 and a burst dimming control switch SW2. When the abnormality detection signal S5 goes to a high level, the error detection time Ta set in the timer circuit 58 of the first protection circuit 50 is set to a short duration of, for example, about 1/10 of that for the normal time.

During a period of which the soft-start control signal SS is at a high level, the voltage source 42 sets the short detection threshold voltage Vth3 to a first voltage value Vth3a. During a period of which the soft-start control signal SS is at a low level, the voltage source 42 sets the short detection threshold voltage Vth3 to a second voltage value Vth3b which is higher than the first voltage value Vth3a. That is, during a start-up period after the control circuit 30 is started, the short detection threshold voltage Vth3 outputted from the voltage source 42 is set lower than that at the normal operation time after the start-up period has elapsed.

In this manner, the second protection circuit 40 monitors the feedback voltage Vfb corresponding to the output voltage Vdrv of the inverter 100. And when the feedback voltage Vfb falls below the short detection threshold voltage Vth3, the second protection circuit 40 lowers the reference voltage Vrefi generated by the voltage source 68 in the pulse width modulator 60.

Figure 10:
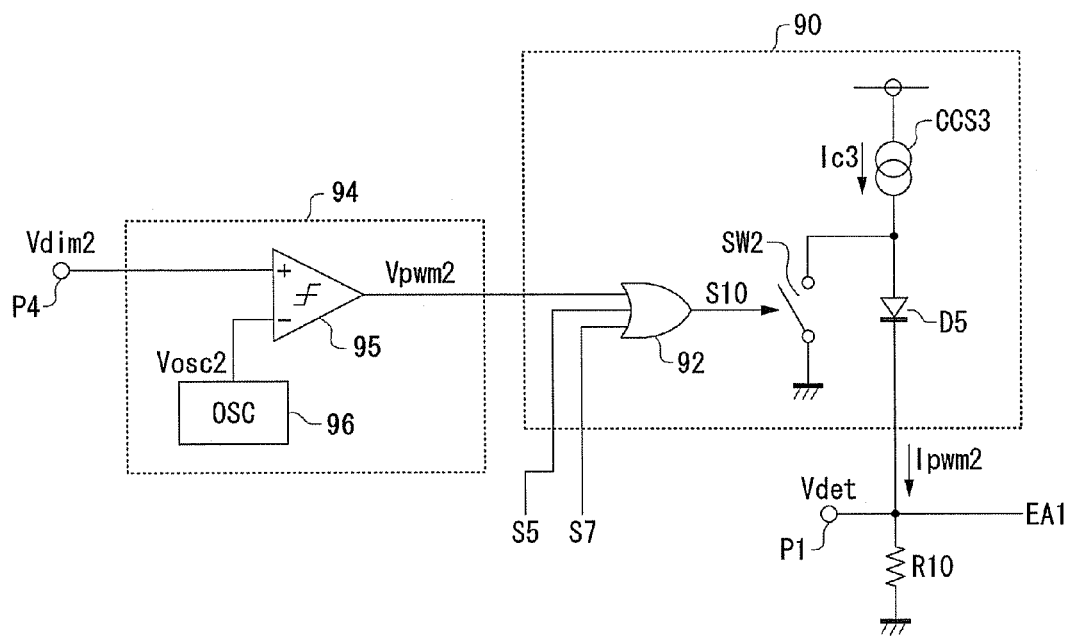
FIG. 10 is a circuit diagram showing a structure of a burst dimming control unit.

FIG. 10 is a circuit diagram showing a structure of the burst dimming control unit 93. The burst dimming control unit 93 includes a burst dimming modulator 94 and a forced off circuit 90.

The burst dimming modulator 94 includes a burst dimming comparator 95 and a second triangular wave signal generator 96. The second triangular wave signal generator 96 generates a second triangular wave signal Vosc2. The frequency of the second triangular wave signal Vosc2 is set lower than that of the triangular wave signal Vosc1 generated by the triangular wave signal generator 66. For example, when the frequency of the triangular wave signal Vosc1 is about several tens to hundreds of kHz, the frequency of the second triangular wave signal Vosc2 is set to about 100 Hz.

The burst dimming comparator 95 compares the burst dimming control voltage Vdim2 with the second triangular wave signal Vosc2. When Vdim2>Vosc2, an output signal of the burst dimming comparator 95 (hereinafter referred to as burst PWM signal Vpwm2) goes to a high level. When Vdim2<Vosc2, it goes to a low level. This PWM signal Vpwm2 is outputted to the forced off circuit 90.

During a period of which the burst PWM signal Vpwm that is the output signal of the burst dimming comparator 95 is at a low level, the forced off circuit 90 raises the detection voltage Vdet to a voltage value where the duty ratio of the PWM signal Vpwm1 is practically 0.

This forced off circuit 90 includes a current source CCS3, a fifth diode D5, a burst dimming control switch SW2, and an OR gate 92. The current source CCS3 generates a constant current Ic3. A cathode of the fifth diode D5 is connected to a first input terminal P1, whereas an anode thereof is connected to the current source CCS3, so that the reversed flow of current is prevented. The burst dimming control switch SW2 is provided between the anode of the fifth diode D5 and ground. When the burst dimming control switch SW2 turns on, the constant current Ic3 flows to ground via the burst dimming control switch SW2. When the burst dimming control switch SW2 turns off, the constant current Ic3 flows through a resistor R10. Note that the resistor R10 may be the resistors R2 or R1 of FIG. 6. The current flowing through the resistor R10 (hereinafter referred to as burst current Ipwm2) is a pulse signal having the same duty ratio as the burst PWM signal Vpwm2.

The OR gate 92 outputs the logical sum of the burst PWM signal Vpwm2 outputted from the burst dimming modulator 94, the short detection signal S7 outputted from the second protection circuit 40 and the abnormality detection signal S5 outputted from the first protection circuit 50. The burst dimming control switch SW2 turns on when an output signal S10 of the OR gate 92 is at a high level, whereas it turns off when the output signal S10 is at a low level.

As the output signal S10 of the OR gate 92 goes to a low-level and thereby the burst dimming control switch SW2 turns off, Ipwm2=Ic3 holds and therefore current flows through the resistor R10. On the other hand, when the burst dimming control switch SW turns on, the burst current becomes 0 (Ipwm2=0).

When the burst dimming control switch SW2 turns off, the potential of the first input terminal P1, namely the detection voltage Vdet, rises up to the potential given by R10×Ic3. The current value of the constant current Ic3 is set to a value where the duty ratio of the PWM signal Vpwm becomes practically 0.

When the current flows through the resistor R10 and the detection voltage Vdet rises, the level of the PWM signal Vpwm1 is fixed and the switching operation of the H-bridge circuit 10 stops. As a result, the supply of the drive voltage Vdrv to the EEFL 210 is stopped and hence the EEFL 210 stops emitting light. That is, the effective luminance of the EEFL 210 is controlled by the duty ratio of the burst PWM signal Vpwm2.

When either one of the abnormality detection signal S5 and the short detection signal S7 goes to a high level, the output signal S10 of the OR gate 92 goes to a high level, independently of the burst PWM signal Vpwm2, and the burst dimming control switch SW2 turns on. Accordingly, when error is detected by the second protection circuit 40 or the first protection circuit 50, the forced off circuit 90 becomes inactive so as to invalidate the burst dimming.

An operation of the inverter 100, structured as above, according to the present embodiment is described.

A description is first given of the adjustment of the luminance of the EEFL 210 by the analog dimming control voltage Vdim1. As described above, the pulse width modulator 60 generates the PWM signal Vpwm1 whose duty ratio is feedback-controlled so that, during a period when the EEFL 210 emits light, the detection voltage Vdet corresponding to the current across the secondary coil 12$b$ of the transformer 12, namely the drive current Idrv flowing through the EEFL 210, is brought close to the analog dimming control voltage Vdim1 inputted from the outside.

FIGS. 11A to 11C are voltage waveform diagrams showing operating states of the inverter 100. FIG. 11A shows the analog dimming control voltage Vdim1 and the reference voltage Vrefi; FIG. 11B shows the error voltage Verr and the triangular wave signal Vosc1; and FIG. 11C shows the PWM signal Vpwm1.

In a range where Vdim1<Vrefi, the error voltage Verr shown in FIG. 11B rises as the analog dimming control voltage Vdim1 increases. When Vdim1>Vrefi, the error voltage Verr becomes fixed. As a result, the duty ratio of the PWM signal Vpwm1 rises gradually in the range of Vdim1<Vrefi, whereas it becomes fixed when Vdim1>Vrefi. As a result, when the analog dimming control voltage Vdim1 is lower than the reference voltage Vrefi, a feedback is provided so that the detection voltage Vdet is brought close to the analog dimming control voltage Vdim1. This can realize a light control from the outside. Also, when the analog dimming control voltage Vdim1 becomes higher than the reference voltage Vrefi, a feedback is provided so that the detection voltage Vdet is brought close to the reference voltage Vrefi. This can cause the EEFL 210 to emit light at luminance predetermined by the control circuit 30. Hence, the drive current Idrv flowing through the secondary coil 12$b$ of the transformer 12 can be restricted to a current value determined by the reference voltage Vrefi or below it.

In particular, when the a plurality of EEFLs 210 are driven by connecting them in parallel, the drive voltage Idrv becomes large and the power consumed increases. For this reason, the safety of circuitry can be enhanced by setting an upper limit to the drive current Idrv.

FIGS. 12A to 12E are timing charts to explain the burst dimming. FIG. 12A shows the burst dimming control voltage Vdim2 and the second triangular wave signal Vosc2; FIG. 12B shows the burst PWM signal Vpwm2; FIG. 12C shows the detection voltage Vdet; FIG. 12D shows the error voltage Verr and the triangular wave signal Vosc1; and FIG. 12E shows the PWM signal Vpwm1.

When Vdim2>Vosc2 before time t0, the burst PWM signal Vpwm2 is at a high level. At this time, the burst dimming control switch SW2 turns on and therefore the detection voltage Vdet is stabilized so that the detection voltage Vdet is equal to the analog dimming control voltage Vdim1. When Vdim2<Vosc2 at time t0, the burst PWM signal Vpwm2 goes to a low level. Thus the burst dimming control switch SW2 turns off and the detection voltage Vdet is forcibly raised. As a result, the error voltage Verr becomes lower than a bottom voltage of the triangular wave signal Vosc1, and the PWM signal Vpwm1 is fixed to a low level, thus stopping the switching operation of the inverter 100. When Vdim2>Vosc2 again at time t1, the switching operation of the inverter 100 is resumed and the EEFL 210 emits light again.

The inverter 100 according to the present embodiment controls the luminance of the EEFL 210 by alternately repeating a stoppage period Tx and an operation period Ty determined by the burst dimming control voltage Vdim2. As the burst dimming control voltage Vdim2 drops, the down time Tx becomes longer, which in turn lowers the light emission luminance.

Next, a circuit protection operation of the inverter 100 is described. FIGS. 13A to 13D and FIGS. 14A to 14D are timing charts showing operating states of the inverter 100, according to the second embodiment, when error is detected. The vertical axis and the horizontal axis in these timing charts are enlarged or reduced as appropriate for the simplicity of explanation.

Using FIGS. 13A to 13D, a description is first given of a case where no ground short is detected. FIG. 13A shows the detection voltage Vdet and the analog dimming control voltage Vdim1; FIG. 13B shows the error voltage Verr; FIG. 13C shows the abnormality detection signal S5 (S3); and FIG. 13D shows the switching stop signal S6.

Prior to time t0, the detection voltage Vdet is stabilized at the analog dimming control voltage Vdim1 (<Vrefi) and the EEFL 210 emits light at the luminance specified from the outside. At this time, the error voltage Verr takes a steady value which is lower than the error detection threshold voltage Vth1.

As the current flowing through the EEFL 210 varies and the current across the secondary coil 12$b$ of the transformer 12 varies at time t0, the detection voltage Vdet also varies together with the variation in the current. At this time, the error voltage Verr obtained by amplifying the error between the detection voltage Vdet and the reference voltage Vrefi rises also and eventually rises above the error detection threshold voltage Vth1. As a result, the abnormality detection signal S5(=S3) goes to a high level at time t0.

As the abnormality detection signal S5 goes to a high level at time t0, the timer circuit 58 starts measuring the error detection time Ta. As the switching stop signal S6 goes to a high level at time t1 after the error detection time Ta has elapsed from time t0, the logic control unit 70 stops the switching control of the H-bridge circuit 10. When the switching control of the H-bridge circuit 10 is stopped, the current flowing through the secondary coil 12$b$ decreases and the detection voltage Vdet also drops down to 0 V.

In this manner, when the circuit failure is detected by the first protection circuit 50 at the time when no ground-short occurs, the inverter 100 according to the present embodiment stops the switching operation of the H-bridge circuit 10 by setting the switching stop signal S6 to a high level after a predetermined error detection time Ta1 has elapsed, and then executes circuit protection.

Figure 14A:
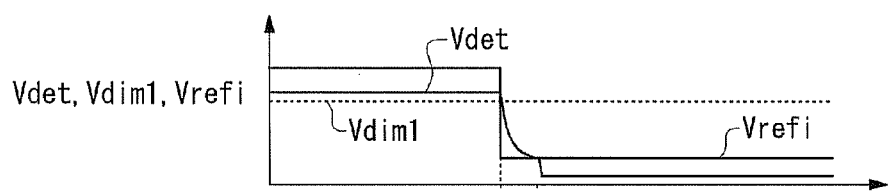
FIGS. 14A to 14D are timing charts showing operating states of an inverter of FIG. 6 at the time of ground-short.
Figure 14B:
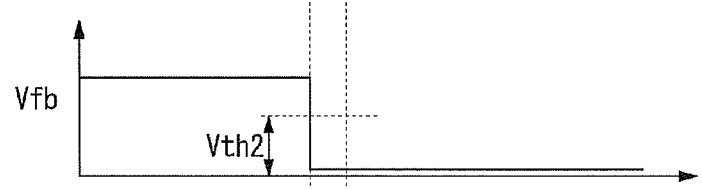
Figure 14C:
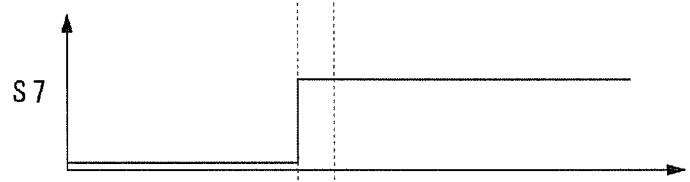
Figure 14D:
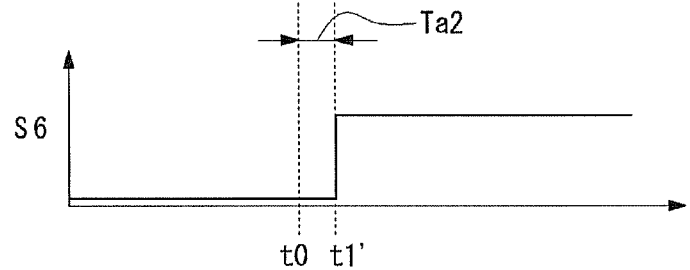

Referring to FIGS. 14A to 14D, a description is next given of the circuit protection at the time when ground short occurs. FIG. 14A shows the detection voltage Vdet, the analog dimming control voltage Vdim1 and the reference voltage Vrefi; FIG. 14B shows the feedback voltage Vfb; FIG. 14C shows the short detection signal S7; and FIG. 14D shows the switching stop signal S6.

During a period prior to time t0, the detection voltage Vdet is so stabilized as to be equal to the analog dimming control voltage Vdim1 (<Vrefi). During the same period, the luminance of the EEFL 210 is controlled by the analog dimming control voltage Vdim1.

At time t0, the output terminal 104 of the inverter 100 is ground-shorted. As the output terminal 104 is ground-shorted, two current paths leading to the ground are formed separately from the path leading to the EEFL 210. As a result, the current across the secondary coil 12b of the transformer increases.

When the output terminal 104 is ground-shorted at time t0, the drive voltage Vdrv appearing at the output terminal 104 gets smaller in amplitude and the feedback voltage Vfb according to the drive voltage Vdrv drops down to near 0 V. When the feedback voltage Vfb becomes lower than the short detection threshold voltage Vth2 at time t0, the short detection signal S7 goes to a high level.

As the short detection signal S7 goes to a high level at time t0, the timer circuit 58 sets the error detection time Ta short and then starts measuring the time. As a result, at time t1' when the error detection time Ta2 has elapsed from time t0, the switching stop signal S6 goes to a high level and the inverter 100 stops. When the inverter 100 stops, the current flowing through the secondary coil 12b drops and the detection voltage Vdet also drops down to 0 V.

In this manner, as it detects the ground-short, the control circuit 30 according to the present embodiment sets the error detection time Ta short and stops the inverter 100 in a shorter duration of time than with no ground-short, so as to protect the circuitry.

With the short detection signal S7 going to a high level at time t0, the reference voltage Vrefi generated by the voltage source 68 in the pulse width modulator 60 drops. As a result, the reference voltage Vrefi becomes lower than the analog dimming control voltage Vdim1, thus invalidating the analog dimming performed from the outside. After time t0, the circuit protection is activated so that the detection voltage Vdet is brought close to the reduced reference voltage Vrefi, that is, the current flowing through the secondary coil 12b of the transformer 12 decreases.

In this manner, according to the control circuit 30 employed in the present embodiment, at the time of ground-short the reference voltage Vrefi is set lower than that at normal operating time. Thereby, the output of the inverter 100 is reduced by invalidating the analog dimming during a period until when the inverter 100 is stopped, and the current flowing through a ground-short path is reduced. At the same time, the power consumed by the circuit can be suppressed, and the protection of the inverter 100 and a set equipped with the inverter 100 can be strengthened.

Also, there is provided the analog dimming stop switch SW1. Hence, if failure such as ground-short is detected, the analog dimming control voltage Vdim will not be inputted to the first error amplifier EA1. As a result, the luminance and the current of the EEFL 210 can be reliably controlled based on the reference voltage Vrefi.

Further, even in a case when the non-lighting of the EEFL 210 to be driven is detected, the analog dimming stop switch SW1 is turned off to invalidate the analog dimming and then the current determined by the reference voltage Verfi is supplied to the EEFL 210. This facilitates the light emission thereof. Such a control is particularly effective for a circuit to drive an EEFL which does not light up easily.

Further, during a start-up period, the control circuit 30 according to the present embodiment lowers the short detection threshold voltage Vth3 generated by the voltage source 42. As a result, in the case of a soft-start that raises slowly the output voltage Vdrv after a start-up, a distinction can be made between a state where the output voltage Vdrv is low due to the short-circuiting and a state where the output voltage Vdrv is low due to the soft-start. Hence, the start-up period can be excluded from the circuit protection executed by the second protection circuit 40.

Further, according to the present invention, when either the abnormality detection signal S5 or the short detection signal S7 goes to a high level, that is, when error is detected in the first protection circuit 50 or the second protection circuit 40, the burst dimming is invalided by turning on the burst dimming control switch SW2 in the forced off circuit 90. This can facilitate the EEFL 210 to light up again if the EEFL 210 goes out.

The above-described embodiment is merely exemplary, and it is understood by those skilled in the art that various modifications to the combination of each component and process thereof are possible and such modifications are also within the scope of the present invention.

In the embodiment, the first protection circuit 50 in the control circuit 30 monitors the error voltage Verr outputted from the first error amplifier EA1 to detect the non-lighting of the EEFL 210 but the present invention is not limited thereto. The first protection circuit 50 may monitor the voltage Vfb according to the output voltage Vdrv and determine the EEFL 210 to be unlit when this voltage exceeds a threshold voltage.

In the present embodiment, the components constituting the control circuit 30 may all be integrated in a single package, or part of them may be comprised of discrete components or chip components. Also, the control circuit 30 may be integrated by including the H-bridge circuit 10. Which of the components is to be integrated in what way may be determined in consideration of the specifications, the cost, the area to be occupied and the like of the inverter 100.

In the present embodiment, the high-level and low-level settings of logical values in a logic circuit are merely exemplary, and they can be changed freely by inverting them as appropriate by an inverter or the like.

In the present embodiment, a description has been given of a case where in the light emitting device 200 two inverters 100 are connected to the EEFL 210 at both ends thereof and the EEFL 210 is driven by the voltages having mutually reversed phases. However, this should not be considered as limiting and, for example, a single inverter 100 may be used to drive the EEFL 210 whose voltage at one end thereof is fixed. Also, a fluorescent tube to be driven is not limited to the EEFL and may be other fluorescent tubes such as CCFL. Also, a load driven by the inverter 100 according to the present embodiment is not limited to the fluorescent tube and may be applied to the driving of other various devices that require AC high voltage, so that the circuit protection can be exercised.

Third Embodiment

Figure 15:
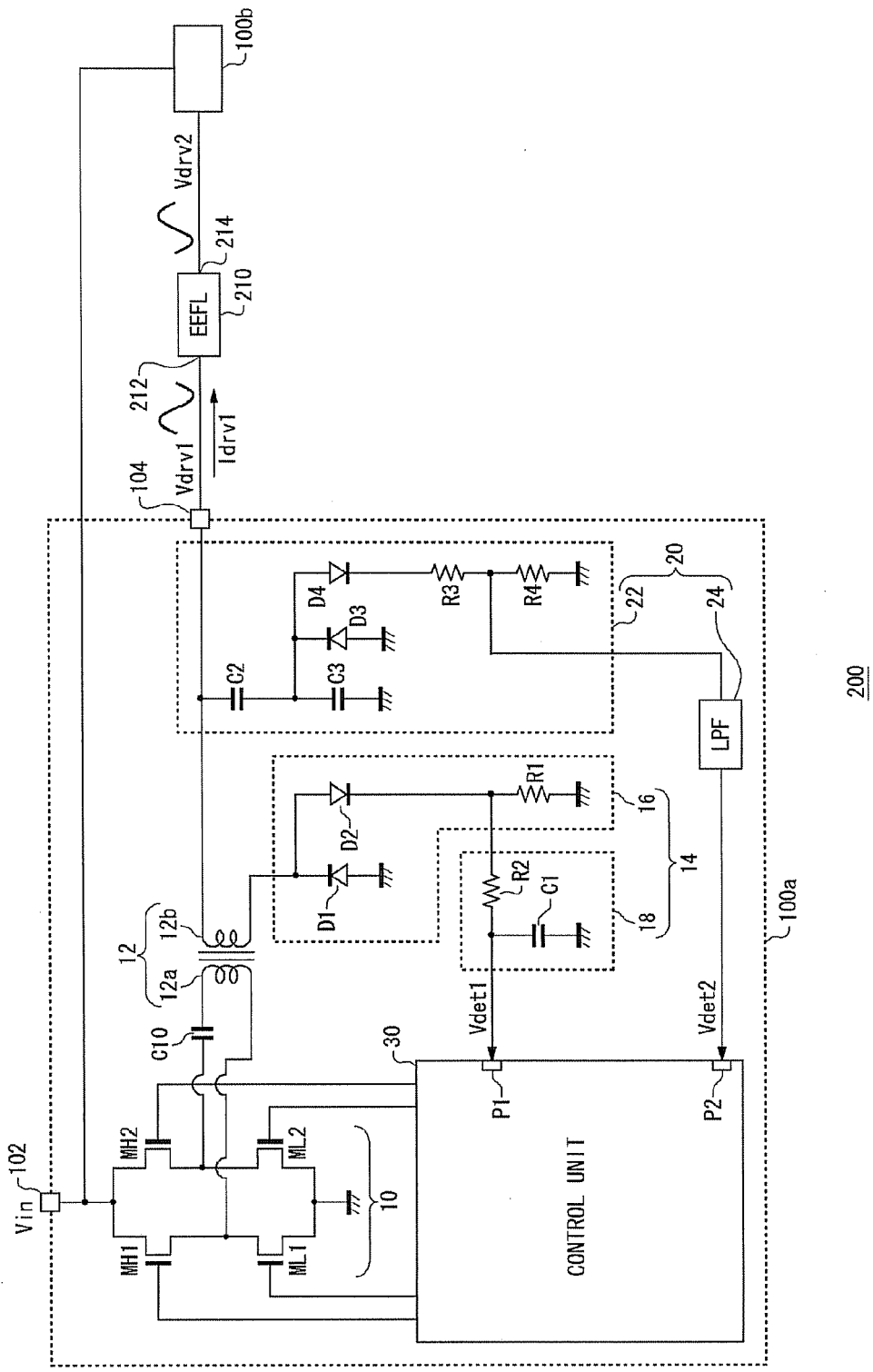
FIG. 15 is a circuit diagram showing a structure of a light emitting device according to a third embodiment.
Figure 16:
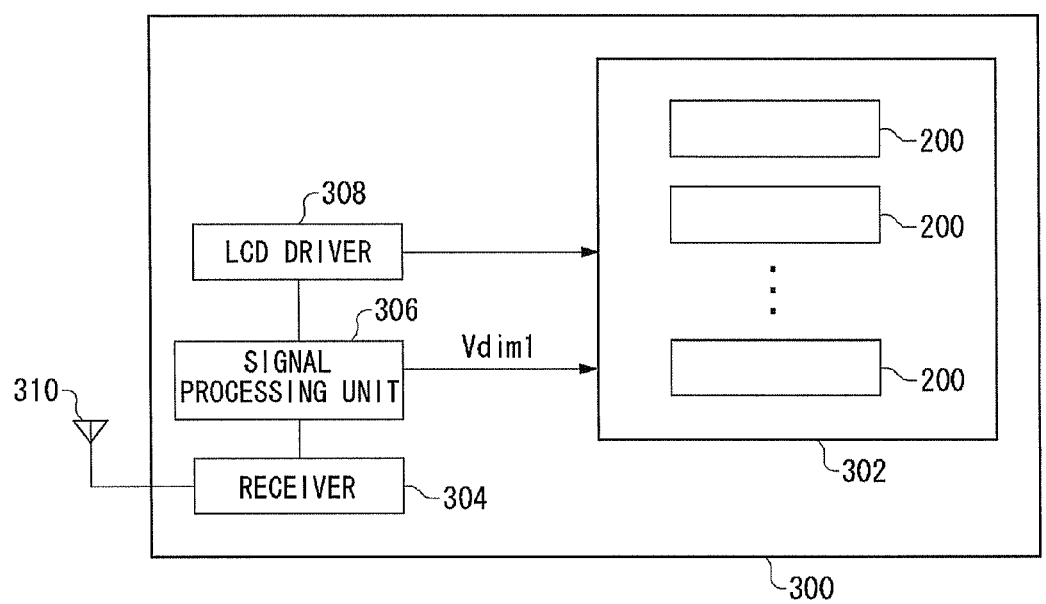
FIG. 16 is a block diagram showing a structure of an LCD television on which light emitting devices of FIG. 15 are mounted.

FIG. 15 is a circuit diagram showing a structure of a light emitting device 200 according to a third embodiment of the present invention. FIG. 16 is a block diagram showing a structure of an LCD television 300 on which the light emitting devices 200 of FIG. 15 are mounted. The LCD television 300 is connected to an antenna 310. The antenna 310 receives broadcast waves and outputs received signals to a receiver 304. The receiver 304 detects and amplifies the received signal so as to be outputted to a signal processing unit 306. The signal processing unit 306 outputs image data, acquired by demodulating the modulated data, to an LCD driver 308. The LCD driver 308 outputs the image data to an LCD panel 302 for each scanning line so as to display videos and images. On the backside of the LCD panel 302, a plurality of light emitting devices 200 are arranged as backlight. The signal processing unit 306 outputs a dimming control voltage Vdim1 to control the operating state of the LCD television 300 or the light emission luminance of the light emitting device 200 according to a user operation.

The light emitting devices 200 of FIG. 15 according to the present embodiment can be suitably used as the backlight for such an LCD panel 302. Hereinbelow, referring back to FIG. 15, a detailed description will be given of a structure and an operation of the light emitting device 200.

The light emitting device 200 according to the present embodiment includes an EEFL 210, a first inverter 100a, and a second inverter 100b. The EEFL 210 is placed on the back surface of the LCD panel 302. The first inverter 100a and the second inverter 100b, which are each a DC/AC converter, convert an input voltage Vin outputted from a DC power supply and inputted to an input terminal 102 into AC voltage and boost it so as to supply a first drive voltage Vdrv1 and a second drive voltage Vdrv2 to a first terminal 212 and a second terminal 214 of the EEFL 210, respectively. The first drive voltage Vdrv1 and the second drive voltage Vdrv2 are AC voltages having mutually reversed phases.

Though there is provided a single EEFL 210 in FIG. 15, a plurality of EEFLs may be arranged in parallel with one another. A description is given hereunder of a structure of the first inverter 100a and the second inverter 100b according to the present embodiment. The first inverter 100a and the second inverter 100b have a similar structure to each other. Thus no distinction will be made therebetween and they will be generically referred to as "inverter 100" in the following description.

The inverter 100 includes an H-bridge circuit 10, a transformer 12, a current-voltage conversion unit 14, a drive voltage detection unit 20, a control circuit 30, and a capacitor C10.

The H-bridge circuit 10 includes four power transistors which are a first high-side transistor MH1, a first low-side transistor ML1, a second high-side transistor MH2 and a second low-side transistor ML2.

One end of the first high-side transistor MH1 is connected to an input terminal 102 to which an input voltage is applied, whereas the other end thereof is connected to a first terminal of a primary coil 12a of the transformer 12. One end of the first low-side transistor ML1 is connected to a ground terminal where the potential thereof is fixed, whereas the other end thereof is connected to the first terminal of the primary coil 12a. One end of the second high-side transistor MH2 is connected to the input terminal 102, whereas the other end thereof is connected to a second terminal of the primary coil via the DC-blocking capacitor C10. One end of the second low-side transistor ML2 is connected to the ground terminal, whereas the other end thereof is connected to the second terminal of the primary coil 12a via the DC-blocking capacitor C10.

The current-voltage conversion unit 14 is provided on a current path of the secondary coil 12b of the transformer 12. The current-voltage conversion unit 14 converts the current flowing through the secondary coil 12b, namely a drive current Idrv flowing through the EEFL 210, into a voltage so as to output it as a first detection voltage Vdet1. The current-voltage conversion unit 14 is configured by including a rectifier circuit 16 and a filter 18.

The rectifier circuit 16 includes a first diode D1, a second diode D2, and a first resistor R1. An anode of the first diode D1 is grounded, whereas a cathode thereof is connected to one end of the secondary coil 12b. An anode of the second diode D2 is connected with the cathode of the first diode D1. The first resistor R1 is provided between a cathode of the second diode D2 and ground. The AC current flowing through the secondary coil 12b is half-wave rectified by the first diode D1 and the second diode D2 so as to flow through the first resistor R1. A voltage drop which is proportional to the current flowing through the secondary coil 12b occurs across the first resistor R1. The rectifier circuit 16 outputs the voltage drop across the first resistor R1.

The filter 18 is a low-pass filer that includes a second resistor R2 and a first capacitor C1. The filter 18 feeds back the first detection voltage Vdet1, where high-frequency components have been removed, to the control circuit 30.

The drive voltage detection unit 20, which is provided between an output terminal 104 of the inverter 100 and ground, is configured by including a rectifier circuit 22 and a filter 24. The drive voltage detection unit 20 generates a DC second detection voltage Vdet2 according to a drive voltage Vdrv outputted from the inverter 100 and then feeds it back to the control circuit 30.

The rectifier circuit 22 includes a second capacitor C2, a third capacitor C3, a third diode D3, a fourth diode D4, a third resistor R3, and a fourth resistor R4. The second capacitor C2 and the third capacitor C3 are connected in series between the output terminal 104 and ground. An anode of the third diode D3 is grounded, whereas a cathode thereof is connected with a connection point of the second capacitor C2 and the third capacitor C3. An anode of the fourth diode D4 is connected to the cathode of the third diode D3. The third resistor R3 and the fourth resistor R4 are connected in series between a cathode of the fourth diode D4 and ground. The drive voltage Vdrv outputted from the output terminal 104, which is AC voltage, is voltage-divided by the second capacitor C2 and the third capacitor C3. The divided drive voltage Vdrv is half-wave rectified by the third diode D3 and the fourth diode D4 and is then further voltage-divided by the third resistor R3 and the fourth resistor R4. The drive voltage divided by the third resistor R3 and the fourth resistor R4 is outputted to the filter 24.

The filter 24 feeds back the second detection voltage Vdet2, where the high-frequency components of a signal outputted from the rectifier circuit 22 have been removed, to the control circuit 30. Similar to the filter 18, the filter 24 may be configured by use of a resistor and a capacitor.

Based on the fed-back first detection voltage Vdet and the fed-back second detection voltage Vdet2, the control circuit 30 controls the on and off of the first high-side transistor MH1, the first low-side transistor ML1, the second high-side transistor MH2 and the second low-side transistor ML2 in the H-bridge circuit 10. A switching voltage is supplied to the primary coil 12a of the transformer 12 by controlling the H-bridge circuit 10. As a result, energy is converted in the transformer 12 and then the first drive voltage Vdrv1 is supplied to the EEFL 210 connected with the secondary coil 12b.

Figure 17:
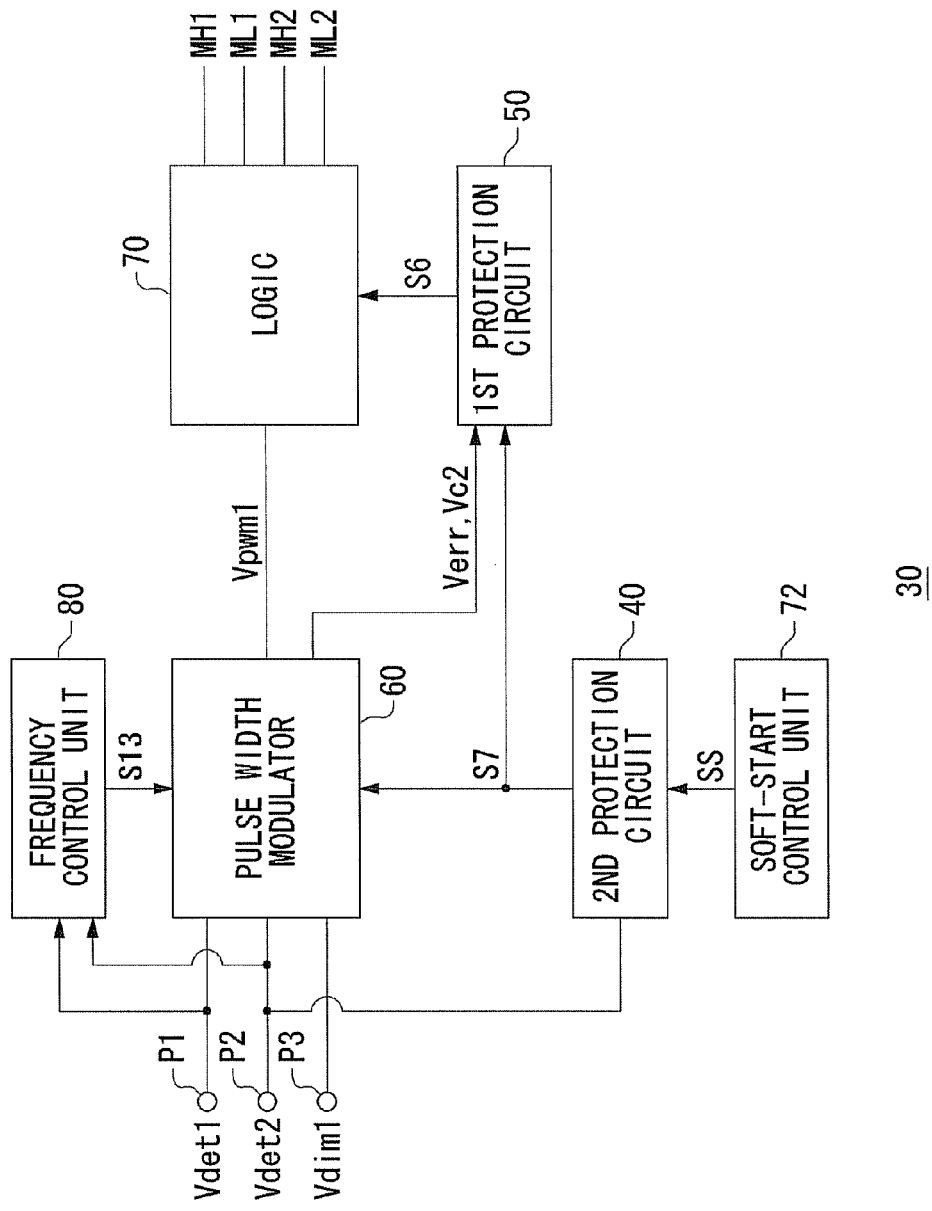
FIG. 17 is a circuit diagram showing a structure of a control circuit according to a third embodiment.

A structure of the control circuit 30 is described as follows. The control circuit 30 performs a switching control of the transformer 12 in the inverter 100 by turning on and off the transistors in the H-bridge circuit 10 connected to the outside. FIG. 17 is a circuit diagram showing a structure of the control circuit 30 according to the third embodiment. A brief overview of the operation of the entire control circuit 30 is first described based on this block diagram.

The control circuit 30, which includes a pulse width modulator 60, a first protection circuit 50, a second protection circuit 40, a logic control unit 70, a soft-start control unit 72 and a frequency control unit 80, is a function IC integrated on a single semiconductor substrate. The control circuit 30 is provided with input terminals P1 to P3. The first detection voltage Vdet1 is inputted to the first input terminal P1; the second detection voltage Vdet2 is inputted to the second input terminal P2; and an analog dimming control voltage Vdim1 is inputted to third input terminal P3.

At start-up of the inverter 100 before the EEFL 210 emits light, the pulse width modulator 60 stabilizes the drive voltage Vdrv, based on the second detection voltage Vdet2. When a predetermined drive voltage Vdrv is supplied to the EEFL 210 which then emits light, the lamp starts to discharge and therefore the drive voltage Vdrv drops. When the EEFL 210 emits light, the pulse width modulator 60 stabilizes the drive current Idrv flowing through the lamp based on the first detection voltage Vdet1 according to the drive current flowing through the lamp, and has the lamp emit light at predetermined luminance. The pulse width modulator 60 generates a pulse-width-modulation (PWM) signal Vpwm1 whose duty ratio varies by a feedback.

The first protection circuit 50 is a block that protects the circuitry by detecting circuit failures in the inverter 100. The first protection circuit 50 outputs a switching stop signal S6 to the logic control unit 70. The switching stop signal S6 is a signal that goes to a high level when a circuit error continues for a predetermined error detection time Ta.

Based on the duty ratio of the PWM signal Vpwm1, the logic control unit 70 controls the on and off of the first high-side transistor MH1, the first low-side transistor ML1, the second high-side transistor MH2 and the second low-side transistor ML2 in the H-bridge circuit 10. After the H-bridge circuit 10 has been switching-controlled, the input voltage Vin which is DC voltage is converted into AC voltage and then outputted as a drive voltage Vdrv. When the switching stop signal S6 goes to a high level, the logic control unit 70 stops the switching of the transistors in the H-bridge circuit 10.

The second protection circuit 40 monitors the second detection voltage Vdet2 according to the output voltage Vdrv of the inverter 100 and detects a state where the amplitude of the output voltage Vdrv is lower than a predetermined value. Such a state is caused by the ground fault in the output terminal 104 of the inverter 100. The second protection circuit 40 outputs a short detection signal S7 which goes to a high level when error like a ground-short is detected. When the high-level short detection signal S7 is inputted, the first protection circuit 50 sets the aforementioned error detection period Ta shorter and reduces the time until the stop of the switching so as to strength the circuitry protection. When the high-level short detection signal S7 is inputted, the pulse width modulator 60 strengthens the circuitry protection by effecting a feedback in a direction that the first detection voltage Vdet1 drops, namely in a direction that the drive current Idrv flowing through the EEFL 210 drops.

The soft-start control unit 72 is a block which controlling a soft-start by gradually raising the output voltage Vdrv of the inverter 100. The soft-start control unit 72 outputs a soft-start control signal SS to the voltage source 42 of the second protection circuit 40. This soft-start signal SS is a signal, for example, which goes to a high level during a start-up period started from when the inverter 100 is started by the control circuit 30 and then goes to a low level. The soft-start control unit 72 may set a predetermined duration of time after a start of the inverter 100, to the start-up period. Or the soft-start control unit 72 may set a period until when a soft-start voltage of a lamp waveform for controlling the soft-start reaches a predetermined potential, to the start-up period. During a period of which the soft-start control signal is at a high level, the second protection circuit 40 lowers a threshold voltage to be compared with the second detection voltage Vdet2.

The frequency control unit 80 monitors the first detection voltage Vdet1 and the second detection voltage Vdet2 according to the drive current Idrv flowing through the secondary coil 12b of the transformer 12 and the drive voltage Vdrv supplied from the inverter 100 to the EEFL 210, respectively. When the detection voltage Vdet1 according to the drive current Idrv is lower than a first predetermined threshold voltage or the second detection voltage Vdet2 according to the drive voltage Vdrv is higher than a second predetermined threshold voltage, the frequency control unit 80 raises the frequency of a triangular wave signal generated by the pulse width modulator 60. In order to switch the frequency of the triangular wave signal Vosc1, the frequency control unit 80 outputs a frequency control signal S13.

A structure of each circuit block is hereinbelow described in detail.

Figure 18:
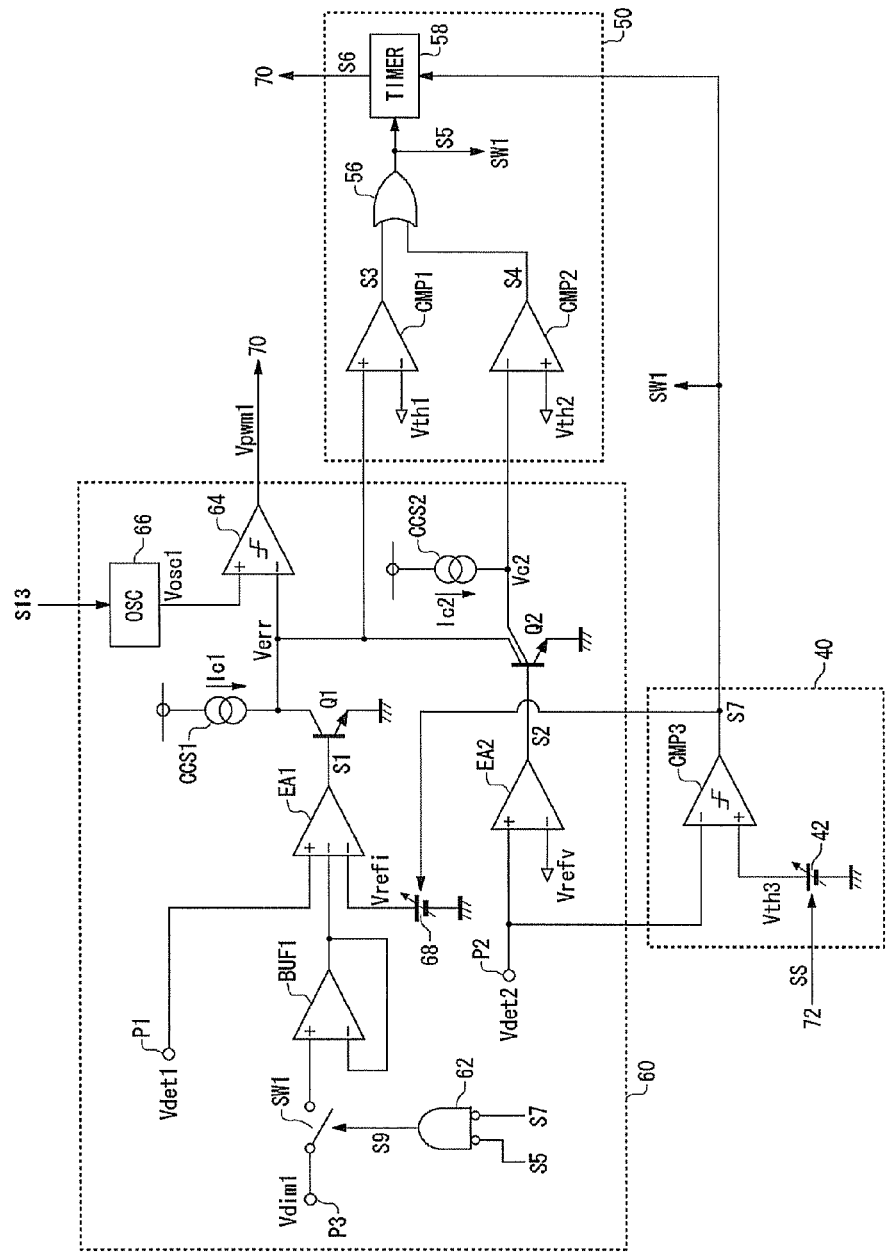
FIG. 18 is a circuit diagram showing a structure of a pulse width modulator, a first protection circuit and a second protection circuit.

FIG. 18 is a circuit diagram showing a structure of the pulse width modulator 60, the first protection circuit 50 and the second protection circuit 40.

The pulse width modulator 60 includes a first constant current source CCS1, a second constant current source CCS2, a first error amplifier EA1, a second error amplifier EA2, a first bipolar transistor Q1, a second bipolar transistor Q2, an AND gate 62, a PWM comparator 64, a triangular wave signal generator 66, a voltage source 68, an analog dimming stop switch SW1, and a buffer BUF1.

The voltage source 68 generates a reference voltage Vrefi that sets an upper limit of current flowing through the EEFL 210. The first error amplifier EA1 is provided with two inverting input terminals. To one of the two inverting input terminals the reference voltage Vrefi outputted from the voltage source 68 is inputted. To the other thereof an analog dimming control voltage Vdim1 is inputted. The first detection voltage Vdet1 fed back from the current-voltage conversion unit 14 is inputted to a noninverting input terminal of the first error amplifier EA1. The first error amplifier EA1 amplifies error between the analog dimming control voltage Vdim1 or the reference voltage Vrefi, whichever is lower, and the first detection voltage Vdet1.

An output signal S1 of the first error amplifier EA1 is inputted to a base of the first bipolar transistor Q1 whose emitter is grounded. The first constant current source CCS1 that generates a constant current Ic1 is connected to a collector of the first bipolar transistor Q1.

On the other hand, a reference voltage Vrefv is inputted to an inverting input terminal of the second error amplifier EA2, whereas the second detection voltage Vdet2 is inputted to a noninverting input terminal thereof. The second error amplifier EA2 amplifies error between the reference voltage Vrefv and the second detection voltage Vdet2.

An output signal S2 of the second error amplifier EA2 is inputted to a base of the second bipolar transistor Q2 whose emitter is grounded. The second bipolar transistor Q2 is a double-collector NPN type bipolar transistor wherein one collector is connected to the first constant current source CCS1 and the other collector is connected to the second constant source CCS that generates a second constant current Ic2.

A voltage appearing at a connection point of the first constant current source CCS1 and the collectors of the first bipolar transistor Q1 and the second bipolar transistor Q2 (hereinafter this voltage will be referred to as error voltage Verr) is inputted to an inverting input terminal of the PWM comparator 64.

Here, before the EEFL 210 emits light, no current flows through the EEFL 210, that is, no current flows through the secondary coil 12b of the transformer 12, and the first detection voltage Vdet1 drops, so that error between the first detection voltage Vdet1 and the reference voltage Vrefi gets larger.

As a result, the signal S1 drops and the first bipolar transistor Q1 turns off. During this time, the constant current Ic1 generated by the first constant current source CCS1 flows through the second bipolar transistor Q2. As a result, the error voltage Verr is generated by the second error amplifier EA2 and the second bipolar transistor Q2, and a feedback is provided so that the second detection voltage Vdet2 is brought close to the reference voltage Vrefv.

As the EEFL 210 emits light and the drive current Idrv flows, the drive voltage Vdrv drops. As a result, the second detection voltage Vdet2 drops and the error between the second detection voltage Vdet2 and the reference voltage Vrefv becomes larger. Therefore the signal S2 drops, and the second bipolar transistor Q2 turns off. After the EEFL 210 emits light and the drive current Idrv flows, the first detection voltage Vdet1 rises and is brought close to the reference voltage Vrefi. As a result, the voltage S1 rises and the first bipolar transistor Q1 turns on. That is, when the EEFL 210 emits light, the error voltage Verr is generated by the first error amplifier EA1 and the first bipolar transistor Q1. Then a feedback is provided so that the first detection voltage Vdet1 is brought close to the reference voltage Vrefi.

The triangular wave signal generator 66 generates a triangular wave signal Vosc1 of a triangular wave shape having a predetermined frequency. The PWM comparator 64 compares the error voltage Verr with the triangular wave signal Vosc1 outputted from the triangular wave signal generator 66. When Verr<Vosc1, the PWM comparator 64 generates a high-level PWM signal. When Verr>Vosc1, it generates a low-level PWM signal.

During a period when the EEFL 210 emits light, the duty ratio of the PWM signal Vpwm is feedback-controlled so that the first detection voltage Vdet1 is brought close to the analog dimming control voltage Vdim1 or the reference voltage Vrefi whichever is lower. On the other hand, when the EEFL 210 does not emit light, it is feedback-controlled so that the second detection voltage Vdet2 is brought close to the reference voltage Vrefv.

In the pulse width modulator 60, the voltage source 68 is a variable voltage source. When the short detection signal S7 outputted from the second protection circuit 40 goes to a high level, the voltage source 68 lowers the reference voltage Vrefi. For example, when the short detection signal S7 is at a high level, the voltage source 68 sets the reference voltage Vrefi to about ¼ of that for the normal time.

The analog dimming stop switch SW1 and the buffer BUF1 are provided between the third input terminal P3 to which the analog dimming control voltage Vdim1 is inputted and the inverting input terminal of the first error amplifier EA1. The on and off of the analog dimming stop switch SW1 is controlled based on the output of the AND gate 62. The short detection signal S7 outputted from the second protection circuit 40 is logically inverted and then inputted to one input terminal of the AND gate 62. The abnormality detection signal S5, which is outputted from the first protection circuit 50 and goes to a high level when a circuit failure occurs, is inverted and then inputted to the other input terminal of the AND gate 62. The analog dimming stop switch SW1 turns on when the output signal S9 of the soft-start control unit 72 goes to a high level, whereas the analog dimming stop switch SW1 turns off when it goes to a low level.

The first protection circuit 50 includes a first error detection comparator CMP1, a second error detection comparator CMP2, an OR gate 56 and a timer circuit 58. The first error detection comparator CMP1 compares the error voltage Verr with a threshold voltage Vth1, and outputs an abnormality detection signal S3 that goes to a high level when Verr>Vth1.

When the detection voltage is not stabilized to the reference voltage Vrefi and the second detection voltage Vdet2 is not stabilized to the reference voltage Vrefv, the abnormality detection signal S3 goes to a high level.

The second error detection comparator CMP2 compares a voltage Vc2 appearing at a connection point of the second constant current source CCS2 and the second bipolar transistor Q2 with a threshold voltage Vth2, and outputs an abnormality detection signal S4 that goes to a high level when Vc2<Vth2. The higher the second detection voltage Vdet2, the lower the voltage Vc2 becomes. Thus, the abnormality detection signal S4 goes to a high level in an overvoltage state.

The OR gate 56 generates the logical sum of the two abnormality detection signals S3 and S4 and outputs it as an abnormality detection signal S5. The abnormality detection signal S4 goes to a high level not only when the circuit becomes overcurrent or overvoltage but also when the EEFL 210 does not emit light.

However, an error detection means in the first protection circuit 50 is not limited thereto, and it is only necessary that a state where the inverter deviates from the stable operation, such as overvoltage of output voltage, overcurrent of output current or overheating errors, can be detected.

The abnormality detection signal S5 is inputted to the timer circuit 58. The timer circuit 58 measures a period during which the abnormality detection signal S5 stays high, and outputs to the logic control unit 70 a switching stop signal S6 that goes to a high level when a predetermined error detection time Ta has elapsed. As the switching stop signal S6 goes to a high level, that is, as an error state of circuitry continues for a predetermined duration of time, the logic control unit 70 stops the switching operation of the H-bridge circuit 10.

The second protection circuit 40 includes a short detection comparator CMP3 and a voltage source 42. The voltage source 42 generates a predetermined threshold voltage (hereinafter referred to as short detection threshold voltage Vth3). The short detection comparator CMP3 compares the second detection voltage Vdet2 with the short detection threshold voltage Vth3 generated by the voltage source 42, and it outputs a short detection signal S7 which goes to a high level when Vdet2<Vth3 and which goes to a low level when Vdet2<Vth3. For example, when the output terminal 104 of the inverter 100 is ground shorted, the short detection signal S7 generated as above goes to a high level. It is to be noted that the second detection voltage Vdet2 monitored by the second protection circuit 40 may be a voltage proportional to the second detection voltage Vdet2 inputted to the second error amplifier EA2.

The abnormality detection signal S5 is outputted to the first protection circuit 50 and the pulse width modulator 60 and is also used to control the on and off of the burst dimming control switch SW2. When the abnormality detection signal S5 goes to a high level, the error detection time Ta set in the timer circuit 58 of the first protection circuit 50 is set to a short duration, for example, about ¼ of that for the normal time.

During a period of which the soft-start control signal SS is at a high level, the voltage source 42 sets the short detection threshold voltage Vth3 to a first voltage value Vth3a. During a period of which the soft-start control signal SS is at a low level, the voltage source 42 sets the short detection threshold voltage Vth3 to a second voltage value Vth3b which is higher than the first voltage value Vth3a. That is, during a start-up period after the control circuit 30 is started, the short detection threshold voltage Vth3 outputted from the voltage source 42 is set lower than that at the normal operation time after the start-up period has elapsed.

In this manner, the second protection circuit 40 monitors the second detection voltage Vdet2 corresponding to the drive voltage Vdrv of the inverter 100. And when the second detection voltage Vdet2 falls below the short detection threshold voltage Vth3, the second protection circuit 40 lowers the reference voltage Vrefi generated by the voltage source 68 in the pulse width modulator 60.

Figure 19:
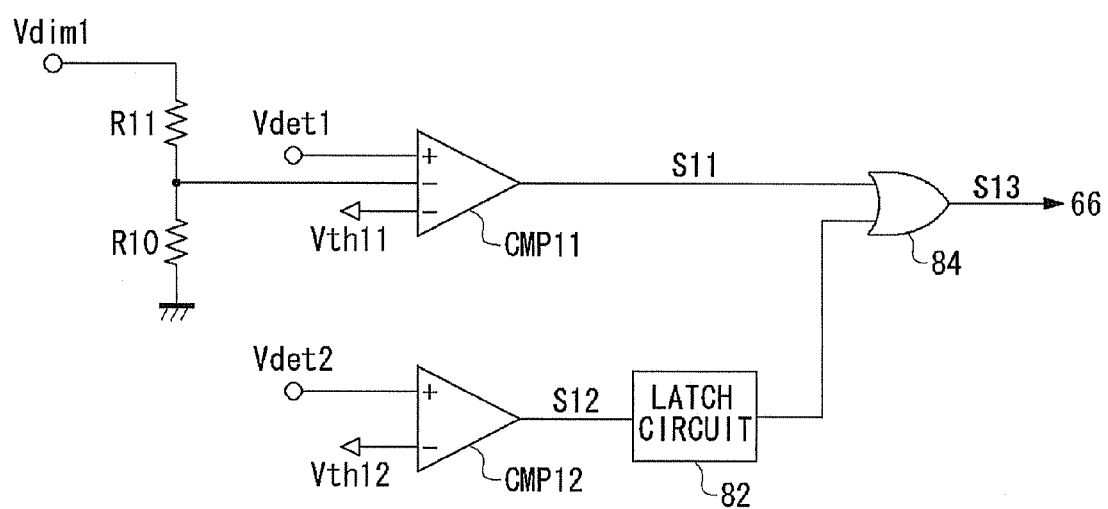
FIG. 19 is a circuit diagram showing a structure of a frequency control unit.

FIG. 19 is a circuit diagram showing a structure of the frequency control unit 80. The frequency control unit 80 includes a first comparator CMP11, a second comparator CMP12, a latch circuit 82, and an OR gate 84. As described above, the frequency control unit 80 monitors detection voltages according to the drive current Idrv and the drive voltage Vdrv, respectively, and switches the switching frequency.

The first detection voltage Vdet1 according to the drive voltage Vdrv is inputted to a noninverting input terminal of the first comparator CMP11. A predetermined reference voltage Vth11 and an analog dimming control voltage Vdim1, which was voltage-divided by a resistor R11 and a resistor R12, are inputted to two inverting input terminals of the first comparator CMP11. The first comparator CMP11 sets the first threshold voltage Vth11 or a voltage proportional to the analog dimming control voltage Vdim1 whichever is lower, to the first threshold voltage and compares it with the first detection voltage Vdet1. As a result, when the first detection voltage Vdet1 is higher, a high level is outputted, whereas when the first detection voltage Vdet1 is lower, a low level is outputted. The first detection voltage Vdet1 inputted to the first comparator CMP11 may be voltage-divided by resistors as appropriate.

The second detection voltage Vdet2 is inputted to a noninverting input terminal of the second comparator CMP12, whereas a second threshold voltage Vth12 is inputted to an inverting input terminal thereof. The second comparator CMP12 compares the second detection voltage Vdet2 with the second threshold voltage Vth12. Then the second comparator CMP12 outputs a high level when Vdet2>Vth12, and it outputs a low level when Vdet2<Vth12. The second detection voltage Vdet2 may be voltage-divided by resistors as appropriate.

An output signal of the second comparator CMP12 (this output signal will be hereinafter referred to as second comparison signal S12) is inputted to the latch circuit 82. The latch circuit 82 latches the second comparison signal S12. The OR gate 84 outputs the logical sum of an output signal of the first comparator CMP11 (hereinafter referred to as first comparison signal S11) and the second comparison signal S12, to the triangular wave signal generator 66 as a frequency control signal S13, and controls the frequency of the triangular wave signal Vosc1.

Figure 20:
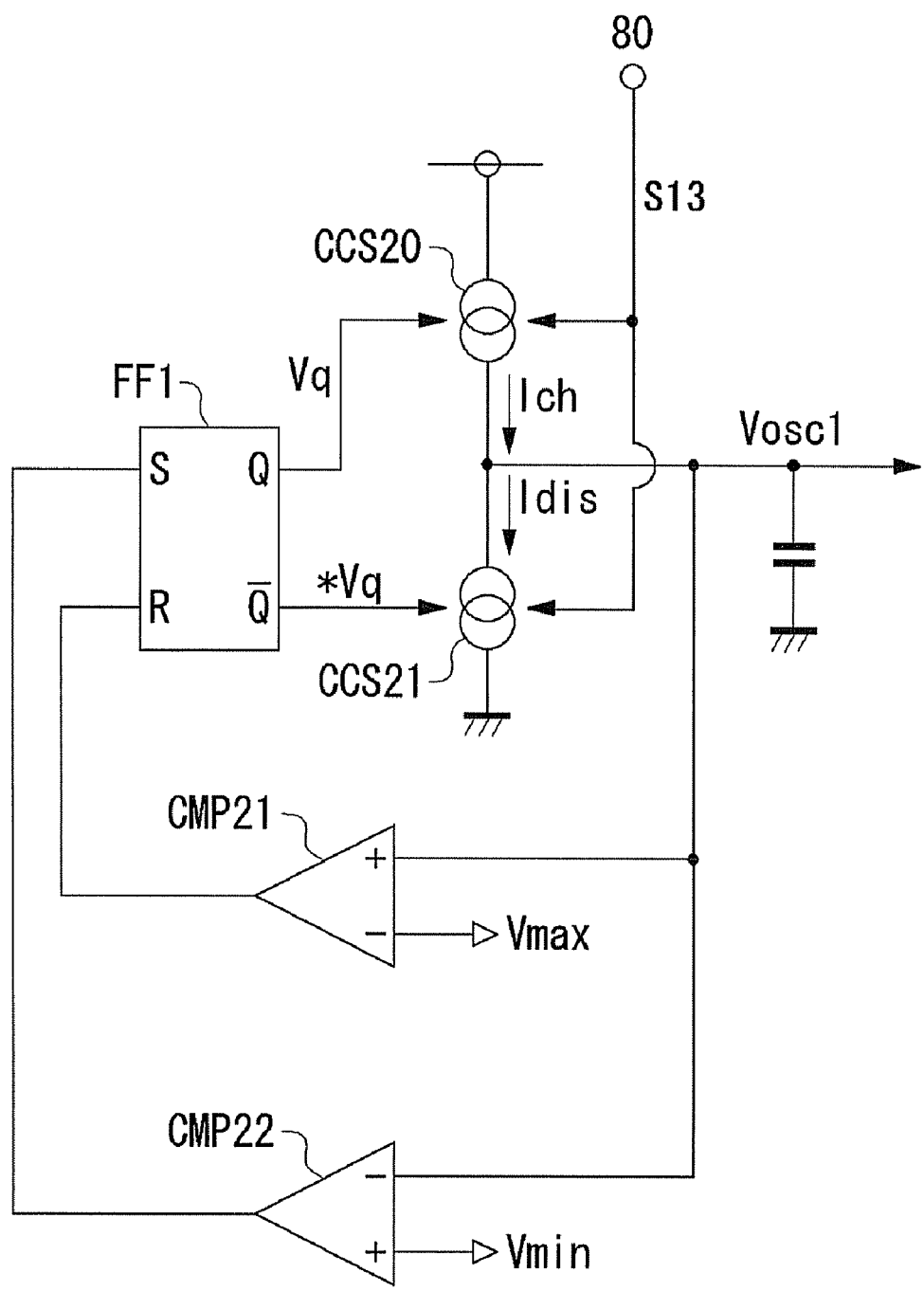
FIG. 20 is a circuit diagram showing an exemplary structure of a triangular wave signal generator.

FIG. 20 is a circuit diagram showing an exemplary structure of the triangular wave signal generator 66. The triangular wave signal generator 66 includes a first comparator CMP21, a second comparator CMP22, an RS flip-flop FF1, a charging constant-current source CCS20, a discharging constant-current source CCS21, and a capacitor C20.

The charging constant-current source CCS20 is a current source which supplies and charges the capacitor C20 with the current wherein one end of the capacitor C20 is grounded. The discharging constant-current source CCS21 is a current source which extracts the charge from the capacitor C20 so as to be discharged. The voltage appearing at the capacitor C20 is outputted as the triangular wave signal Vosc1.

The first comparator CMP21 compares the potential of the triangular wave signal Vosc1 with a maximum voltage Vmax by which to set a peak value of a triangular wave signal to be outputted. When Vosc>Vmax, the first comparator CMP21 outputs a high level. Also, the second comparator CMP22 compares the potential of the triangular wave signal Vosc with a minimum voltage Vmin by which to set a bottom value of a triangular wave signal to be outputted. When Vosc<Vmin, the second comparator CMP22 outputs a high level.

Output signals of the first comparator CMP21 and the second comparator CMP22 are inputted to a set terminal and a reset terminal of the RS flip-flop FF1, respectively. An output signal Vq of the RS flip-flop FF1 is outputted to the charging constant-current source CCS20, whereas an inverted output signal *Vq is outputted to the discharging constant-current source CCS21. When the output signal Vq goes to a high level, the charging constant-current source CCS20 turns on so as to charge the capacitor C20 with a charging current Ich. When the inverted output signal *Vq goes to a high level, the discharging constant-current source CCS21 turns on so as to discharge the capacitor C20 with a discharging current Idis.

The frequency control signal S13 outputted from the frequency control unit 80 is inputted to the charging constant-current source CCS20 and the discharging constant-current source CCS21. When the frequency control signal S13 goes to a high level, the charging constant-current source CCS20 and the discharging constant-current source CCS21 increase the charging current Ich and the discharging current Idis, respectively. For example, if the charging current Ich and the discharging current Idis are each set to 10 times as much as they are while the frequency control signal S13 is at a high level, the frequency of the triangular wave signal Vosc1 will become 10 times.

The triangular wave signal Vosc whose peak voltage and bottom voltage are set to Vmax and Vmin, respectively, is outputted, at a frequency according to the frequency control signal S13, from the triangular wave signal generator 66. Note that the triangular wave signal generator 66 may be structured by use of a hysteresis comparator.

An operation of the inverter 100, structured as above, according to the present embodiment is described.

A description is first given of the adjustment of the luminance of the EEFL 210 by the analog dimming control voltage Vdim1. As described above, the pulse width modulator 60 generates the PWM signal Vpwm1 whose duty ratio is feedback-controlled so that, during a period when the EEFL 210 emits light, the first detection voltage Vdet1 corresponding to the current across the secondary coil 12b of the transformer 12, namely the drive current Idrv flowing through the EEFL 210, is brought close to the analog dimming control voltage Vdim1 inputted from the outside.

FIGS. 21A to 21C are voltage waveform diagrams showing operating states of the inverter 100. FIG. 21A shows the analog dimming control voltage Vdim1 and the reference voltage Vrefi; FIG. 21B shows the error voltage Verr and the triangular wave signal Vosc1; and FIG. 21C shows the PWM signal Vpwm1.

In a range where Vdim1<Vrefi, the error voltage Verr shown in FIG. 21B rises as the analog dimming control voltage Vdim1 increases. When Vdim1>Vrefi, the error voltage Verr becomes fixed. As a result, the duty ratio of the PWM signal Vpwm1 rises gradually in the range of Vdim1<Vrefi, whereas it becomes fixed when Vdim1>Vrefi. As a result, when the analog dimming control voltage Vdim1 is lower than the reference voltage Vrefi, a feedback is provided so that the first detection voltage Vdet1 is brought close to the analog dimming control voltage Vdim1. This can realize a light control from the outside. Also, when the analog dimming control voltage Vdim1 becomes higher than the reference voltage Vrefi, a feedback is provided so that the first detection voltage Vdet1 is brought close to the reference voltage Vrefi. This can cause the EEFL 210 to emit light at luminance predetermined by the control circuit 30. Hence, the drive current Idrv flowing through the secondary coil 12b of the transformer 12 can be restricted to a current value determined by the reference voltage Vrefi or below it.

In particular, when a plurality of EEFLs 210 are driven by connecting them in parallel, the drive voltage Idrv becomes large and the power consumption increases. For this reason, the safety of circuitry can be enhanced by setting an upper limit to the drive current Idrv.

A description is given hereinbelow of a frequency control in the inverter 100 according to the third embodiment. FIGS. 22A to 22E are timing charts showing how the frequency control unit 80 performs the frequency control. FIG. 22A shows the second detection voltage Vdet2; FIG. 22B shows the first detection voltage Vdet1; FIG. 22C shows the second comparison signal S12 outputted from the second comparator CMP12; FIG. 22D shows the first comparison signal S11 outputted from the first comparator CMP11; and FIG. 22E shows the frequency control signal S13.

At time t0, an operation of the inverter 100 is started by the soft-start control unit 72. During a soft-start period, the pulse width modulator 60 provides a feedback so that the second detection voltage Vdet2 is brought close to a soft-start voltage by the second error amplifier EA2, thereby raising the drive voltage Vdrv. During this period, the second detection voltage Vdet2 is lower than the second threshold voltage Vth12 and therefore the second comparison signal S12 is at a low level.

Also, during the soft-start period, the EEFL 210 is not lit. Thus the drive current Idrv does not flow, the first detection voltage Vdet1 becomes 0 V, and the first comparison signal S11 is at a high level.

During the soft-start period, the frequency control signal S13, obtained as a logical synthesis of the first comparison signal S11 and the second comparison signal S12, goes to a high level. Hence, the frequency of the triangular wave signal Vosc1 generated by the triangular wave signal generator 66 is set higher.

When at time t1 the second detection voltage Vdet2 becomes higher than the second threshold voltage Vth12, the second comparison signal S12 goes to a high level.

When the EEFL 210 emits light, the first detection voltage Vdet1 according to the drive current Idrv increases. At this time, with the light emitted by the EEFL 210, the drive voltage Vdrv drops; at time t2 the second detection voltage Vdet2 becomes lower than the second threshold voltage Vth12; and the second comparison signal S12 goes to a low level. When the EEFL 210 emits light, the feedback by the second error amplifier EA2 in the pulse width modulator 60 is invalidated. Then the drive current Idrv is controlled by the first error amplifier EA1 so that the first detection voltage Vdet1 is brought close to the analog dimming control voltage Vdim1; and the first detection voltage Vdet1 rises. When Vdet1>Vth11 at time t2, the first comparison signal S11 goes to a low level. At this time, since both the first comparison signal S11 and the second comparison signal S12 go to low levels, the frequency control signal S13 transits to a low level and the frequency of the triangular wave signal Vosc1 drops.

When at time t3 the EEFL 210 goes out for some reasons, the discharging stops. Hence, the second detection voltage Vdet2 according to the drive voltage Vdrv rises and exceeds the second threshold voltage Vth12, so that the second comparison signal S12 goes to a high level. Also, the stoppage of the discharging prevents the flow of the drive current Idrv. Thus, the first detection voltage Vdet1 drops and falls below the first threshold voltage Vth11, so that the first comparison signal S11 goes to a high level, too. As a result, the frequency control signal S13 goes to a high level so as to raise the frequency of the triangular wave signal Vosc1. This facilitates the light emission of the EEFL 210. When the EEFL 210 emits light again at time t4, the frequency control signal S13 goes to a low level. Hence, the frequency of the triangular wave signal Vosc1 is so set lower as to agree with the resonance frequency of circuitry.

A description has been given of structures and operations of the inverters 100 according to the first to the third embodiment. The control circuit 30 according to the present embodiment detects the non-lighting state of the EEFL 210 by monitoring the two detection voltages Vdet according to the drive voltage Vdrv and the drive current Idrv supplied to the EEFL 210. The resonance frequency of a resonator constituted by including the EEFL 210 varies. Thus, if the frequency of the triangular wave signal Vosc1 generated by the triangular wave signal generator 66 at the time of the non-lighting of the EEFL 210 is raised, the duration of time required until the EEFL 210 emits light again can be reduced and therefore the EEFL 210 can be made to stably emit light.

According to the third embodiment, the threshold voltage at the inverting input terminal side of the first comparator CMP11 is set to either the voltage proportional to the analog dimming control voltage Vdim1 or the first threshold voltage Vth11 whichever is lower. As a result, even in a case when the analog dimming control voltage Vdim1 is to be set lower in order to lower the luminance of the EEFL 210, the threshold voltage to be compared with the first detection voltage Vdet1 can be set lower according to the analog dimming control voltage Vdim1. This enables the non-lighting state of the EEFL 210 to be detected optimally.

The above-described embodiment is merely exemplary, and it is understood by those skilled in the art that various other modifications to the combination of each component and process thereof are possible and such modifications are also within the scope of the present invention.

In the present embodiment, the components constituting the control circuit 30 may all be integrated in a single package, or part of them may be comprised of discrete components or chip components. Also, the control circuit 30 may be integrated by including the H-bridge circuit 10. Which of the components is to be integrated in what way may be determined in consideration of the specifications, the cost, the area to be occupied and the like of the inverter 100.

In the present embodiment, the high-level and low-level settings of logical values in a logic circuit are merely exemplary, and they can be changed freely by inverting them as appropriate by an inverter or the like.

In the present embodiment, a description has been given of a case where in the light emitting device 200 two inverters 100 are connected to the EEFL 210 at both ends thereof and the EEFL 210 is driven by the voltages having mutually reversed phases. However, this should not be considered as limiting and, for example, a single inverter 100 may be used to drive the EEFL 210 whose voltage at one end thereof is fixed. Also, a fluorescent tube to be driven is not limited to the EEFL and may be other fluorescent tubes such as CCFL.

While the preferred embodiments of the present invention have been described using specific terms, such description is for illustrative purposes only, and it is to be understood that changes and variations may be made without departing from the spirit or scope of the appended claims.

What is claimed is:
1. A control circuit, for controlling an inverter including a transformer, the control circuit comprising:
a pulse modulator which generates a pulse signal where a duty ratio thereof is feedback-controlled in a manner such that a detection voltage corresponding to a current across a secondary coil of the transformer is brought close to a reference voltage;
a logic control unit which performs a switching control of the current across the primary coil of the transformer, based on the pulse signal outputted from said pulse modulator;
a first protection circuit which detects a circuit failure of the inverter and which stops the switching control of the inverter when the circuit failure continues for a predetermined duration of error detection time; and
a second protection circuit which monitors a feedback voltage corresponding to an output voltage of the inverter and which sets the duration of error detection time shorter and lowers the reference voltage when the feedback voltage is lower than a predetermined threshold voltage.

2. A control circuit according to claim 1, said first protection circuit including:
a capacitor whose potential at one end thereof is fixed;
a current source which generates a charging current and charges the capacitor; and
a first comparator which compares a voltage appearing across the capacitor with a voltage corresponding to the duration of error detection time,
wherein when the feedback voltage is lower than the threshold voltage, said second protection circuit increases the charging current.

3. A control circuit according to claim 1, said second protection circuit including:
a voltage source which generates the threshold voltage; and
a second comparator which compares the feedback voltage with the threshold voltage generated by the voltage source,
wherein during a start-up period after said control circuit is started, the voltage source sets the threshold voltage lower than that at normal operating time after the start-up period has elapsed.

4. A control circuit according to claim 1, wherein said pulse modulator, said logic control unit and said first and said second protection circuit are integrated on a single semiconductor substrate.

5. An inverter, comprising:
a transformer;
a control circuit which performs a switching control on current across a primary coil of said transformer; the control circuit comprising:
a pulse modulator which generates a pulse signal where a duty ratio thereof is feedback-controlled in a manner such that a detection voltage corresponding to a current across a secondary coil of the transformer is brought close to a reference voltage;
a logic control unit which performs a switching control of the current across the primary coil of the transformer, based on the pulse signal outputted from said pulse modulator;
a first protection circuit which detects a circuit failure of the inverter and which stops the switching control of the inverter when the circuit failure continues for a predetermined duration of error detection time; and
a second protection circuit which monitors a feedback voltage corresponding to an output voltage of the inverter and which sets the duration of error detection time shorter and lowers the reference voltage when the feedback voltage is lower than a predetermined threshold voltage; and
a current-voltage conversion unit, provided on a current path of a secondary coil of said transformer, which converts current flowing through the secondary coil into voltage so as to be fed back to said control circuit as the detection voltage.

6. A light emitting device, comprising:
a fluorescent lamp; and
an inverter which supplies output voltage to said fluorescent lamp as a drive voltage, the inverter comprising:
a transformer;
a control circuit which performs a switching control on current across a primary coil of said transformer; the control circuit comprising:
a pulse modulator which generates a pulse signal where a duty ratio thereof is feedback-controlled in a manner such that a detection voltage corresponding to a current across a secondary coil of the transformer is brought close to a reference voltage;
a logic control unit which performs a switching control of the current across the primary coil of the transformer, based on the pulse signal outputted from said pulse modulator;
a first protection circuit which detects a circuit failure of the inverter and which stops the switching control of the inverter when the circuit failure continues for a predetermined duration of error detection time; and
a second protection circuit which monitors a feedback voltage corresponding to an output voltage of the inverter and which sets the duration of error detection time shorter and lowers the reference voltage when the feedback voltage is lower than a predetermined threshold voltage; and
a current-voltage conversion unit, provided on a current path of a secondary coil of said transformer, which converts current flowing through the secondary coil into voltage so as to be fed back to said control circuit as the detection voltage.

7. A light emitting device according to claim 6, wherein a plurality of said fluorescent lamps are connected in parallel.

8. A light emitting device according to claim 6, wherein two of said inverters are provided at both ends of said fluorescent lamp, respectively, and supply drive voltages of mutually reversed phases to said fluorescent lamp.

9. A light emitting device according to claim 6, wherein said fluorescent lamp is a cold cathode fluorescent lamp.

10. A light emitting device according to claim 6, wherein said fluorescent lamp is an external electrode fluorescent lamp.

11. A liquid-crystal television, comprising:
a liquid-crystal panel; and
a plurality of light emitting devices arranged on a backside of said liquid-crystal panel, at least one of the plurality of light emitting devices comprising:
a fluorescent lamp; and
an inverter which supplies output voltage to said fluorescent lamp as a drive voltage, the inverter comprising:
a transformer;
a control circuit which performs a switching control on current across a primary coil of said transformer; the control circuit comprising:

a pulse modulator which generates a pulse signal where a duty ratio thereof is feedback-controlled in a manner such that a detection voltage corresponding to a current across a secondary coil of the transformer is brought close to a reference voltage;

a logic control unit which performs a switching control of the current across the primary coil of the transformer, based on the pulse signal outputted from said pulse modulator;

a first protection circuit which detects a circuit failure of the inverter and which stops the switching control of the inverter when the circuit failure continues for a predetermined duration of error detection time; and a second protection circuit which monitors a feedback voltage corresponding to an output voltage of the inverter and which sets the duration of error detection time shorter and lowers the reference voltage when the feedback voltage is lower than a predetermined threshold voltage; and a current-voltage conversion unit, provided on a current path of a secondary coil of said transformer, which converts current flowing through the secondary coil into voltage so as to be fed back to said control circuit as the detection voltage.

12. A control circuit of an inverter for driving a fluorescent lamp, the control circuit comprising:

a voltage source which generates a predetermined reference voltage;

an error amplifier which amplifies error between either an analog dimming control voltage inputted externally to adjust the luminance of a fluorescent lamp to be driven or the reference voltage generated by said voltage source, whichever is lower, and a detection voltage according to a current flowing through a secondary coil of a transformer in the inverter;

a pulse-width-modulation comparator which compares error voltage outputted from said error amplifier with a triangular wave voltage so as to output a pulse-width-modulation signal; and a logic control unit which performs a switching control of the current across the primary coil of the transformer, based on the pulse-width-modulation signal outputted from said pulse-width-modulation comparator.

13. A control circuit according to claim 12, further comprising a protection circuit which monitors a feedback voltage according to an output voltage of the inverter and which lowers the reference voltage when the feedback voltage is lower than a predetermined threshold voltage.

14. A control circuit according to claim 12, further comprising an analog dimming stop switch provided between an input terminal of the analog dimming control voltage and said error amplifier, wherein said analog dimming stop switch is turned off when the fluorescent lamp to be driven does not emit light.

15. A control circuit according to claim 12, further comprising an analog dimming stop switch provided between an input terminal of the analog dimming control voltage and said error amplifier, wherein said analog dimming stop switch is turned off when the fluorescent lamp to be driven does not emit light, and wherein said protection circuit turns off said analog dimming stop switch when the feedback voltage is lower than the threshold voltage.

16. A control circuit according to claim 12, further comprising:

a burst dimming comparator which compares a burst dimming control voltage inputted externally with a second triangular wave voltage whose frequency is set lower than that of the triangular wave voltage; and a forced off circuit which refers to an output signal of said burst dimming comparator and raises forcibly the detection voltage to a voltage value, where a duty ratio of the pulse-width-modulation signal becomes practically 0, during a period of which the burst dimming control voltage is lower than the second triangular wave voltage.

17. A control circuit according to claim 13, further comprising:

a burst dimming comparator which compares a burst dimming control voltage inputted externally with a second triangular wave voltage whose frequency is set lower than that of the triangular wave voltage; and a forced off circuit which refers to an output signal of said burst dimming comparator and raises forcibly the detection voltage to a voltage value, where a duty ratio of the pulse-width-modulation signal becomes practically 0, during a period of which the burst dimming control voltage is lower than the second triangular wave voltage.

wherein when the feedback voltage is lower than the threshold voltage, said protection circuit sets said forced off circuit inactive and stops burst dimming.

18. A control circuit according to claim 12, wherein said voltage source, said error amplifier, said pulse-width-modulation comparator and said logic control unit are integrated on a single semiconductor substrate.

19. An inverter, comprising:

a transformer in which a fluorescent lamp to be driven is connected to a secondary coil thereof;

a control circuit which performs a switching control on current across a primary coil of said transformer; the control circuit comprising:

a voltage source which generates a predetermined reference voltage;

an error amplifier which amplifies error between either an analog dimming control voltage inputted externally to adjust the luminance of a fluorescent lamp to be driven or the reference voltage generated by said voltage source, whichever is lower, and a detection voltage according to a current flowing through a secondary coil of a transformer in the inverter;

a pulse-width-modulation comparator which compares error voltage outputted from said error amplifier with a triangular wave voltage so as to output a pulse-width-modulation signal; and a logic control unit which performs a switching control of the current across the primary coil of the transformer, based on the pulse-width-modulation signal outputted from said pulse-width-modulation comparator; and a current-voltage conversion unit, provided on a current path of the secondary coil of said transformer, which converts current flowing through the secondary coil into voltage so as to be fed back to said control circuit as the detection voltage.

20. A light emitting device, comprising:
a fluorescent lamp; and
an inverter which supplies output voltage to said fluorescent lamp as a drive voltage, the inverter comprising:
a transformer in which a fluorescent lamp to be driven is connected to a secondary coil thereof;
a control circuit which performs a switching control on current across a primary coil of said transformer; the control circuit comprising;
a voltage source which generates a predetermined reference voltage;
an error amplifier which amplifies error between either an analog dimming control voltage inputted externally to adjust the luminance of a fluorescent lamp to be driven or the reference voltage generated by said voltage source, whichever is lower, and a detection voltage according to a current flowing through a secondary coil of a transformer in the inverter;
a pulse-width-modulation comparator which compares error voltage outputted from said error amplifier with a triangular wave voltage so as to output a pulse-width-modulation signal; and
a logic control unit which performs a switching control of the current across the primary coil of the transformer, based on the pulse-width-modulation signal outputted from said pulse-width-modulation comparator; and
a current-voltage conversion unit, provided on a current path of the secondary coil of said transformer, which converts current flowing through the secondary coil into voltage so as to be fed back to said control circuit as the detection voltage.

21. A light emitting device according to claim 20, wherein a plurality of said fluorescent lamps are connected in parallel.

22. A light emitting device according to claim 20, wherein two of said inverters are provided at both ends of said fluorescent lamp, respectively, and supply drive voltages of mutually reversed phases to said fluorescent lamp.

23. A light emitting device according to claim 20, wherein said fluorescent lamp is an external electrode fluorescent lamp.

24. A liquid-crystal television, comprising:
a liquid-crystal panel;
a plurality of light emitting devices arranged on a backside of said liquid-crystal panel, at least one of the plurality of light emitting devices comprising:
a fluorescent lamp; and
an inverter which supplies output voltage to said fluorescent lamp as a drive voltage, the inverter comprising:
a transformer in which a fluorescent lamp to be driven is connected to a secondary coil thereof;
a control circuit which performs a switching control on current across a primary coil of said transformer; the control circuit comprising:
a voltage source which generates a predetermined reference voltage;
an error amplifier which amplifies error between either an analog dimming control voltage inputted externally to adjust the luminance of a fluorescent lamp to be driven or the reference voltage generated by said voltage source, whichever is lower, and a detection voltage according to a current flowing through a secondary coil of a transformer in the inverter;
a pulse-width-modulation comparator which compares error voltage outputted from said error amplifier with a triangular wave voltage so as to output a pulse-width-modulation signal; and
a logic control unit which performs a switching control of the current across the primary coil of the transformer, based on the pulse-width-modulation signal outputted from said pulse-width-modulation comparator; and
a current-voltage conversion unit, provided on a current path of the secondary coil of said transformer, which converts current flowing through the secondary coil into voltage so as to be fed back to said control circuit as the detection voltage; and
a signal processing unit which outputs the analog dimming control voltage to the inverter in said light emitting device.

25. A control circuit of an inverter for driving a fluorescent lamp, the control circuit comprising:
an error amplifier which amplifies error between a dimming control voltage to adjust the luminance of a fluorescent lamp to be driven and a detection voltage according to a drive current flowing through a secondary coil of a transformer in the inverter;
a triangular wave signal generator which generates a triangular wave signal;
a pulse-width-modulation comparator which compares error voltage outputted from said error amplifier with the triangular wave signal outputted from said triangular wave signal generator so as to output a pulse-width modulation-signal;
a logic control unit which performs a switching control of the current across the primary coil of the transformer, based on the pulse-width-modulation signal outputted from said pulse-width-modulation comparator; and
a frequency control unit which monitors detection voltages according to the drive current flowing through the secondary coil of the transformer and a drive voltage supplied to the fluorescent lamp from the inverter, respectively, and which raises the frequency of the triangular wave signal when a first detection voltage according to the drive current is lower than a first predetermined threshold voltage or a second detection voltage according to the drive voltage is higher than a second predetermined threshold voltage.

26. A control circuit according to claim 25, said frequency control unit including:
a first comparator which compares the first detection voltage according to the drive voltage with the first threshold voltage and which sets an output to a predetermined level when the first detection voltage is lower than the first threshold voltage;
a second comparator which compares the second detection voltage according to the drive current with the second threshold voltage and which sets an output to a predetermined level when the second detection voltage is higher than the second threshold voltage; and
a logic gate which performs a logical operation of the output signals of the first and the second comparator,
wherein said frequency control unit controls the frequency of the triangular wave signal by an output signal of the logic gate.

27. A control circuit according to claim 26, wherein the first comparator sets either a voltage proportional to the dimming control voltage or a predetermined reference voltage, whichever is lower, to the first threshold voltage with which the first detection voltage is compared.

28. A control circuit according to claim 25, said triangular wave signal generator including:
a capacitor; and
a charge-discharge circuit which supplies a charging current to the capacitor and pulls out a discharging current from the capacitor,
wherein said frequency control unit raises the frequency of the triangular wave signal by increasing the charging current and the discharging current of the charge- discharge circuit.

29. A control circuit according to claim 25, wherein said control circuit is integrated on a single semiconductor substrate.

30. An inverter, comprising:
a transformer in which a fluorescent lamp to be driven is connected to a secondary coil thereof;
a control circuit which performs a switching control on current across a primary coil of said transformer, the control circuit comprising:
an error amplifier which amplifies error between a dimming control voltage to adjust the luminance of a fluorescent lamp to be driven and a detection voltage according to a drive current flowing through a secondary coil of a transformer in the inverter;
a triangular wave signal generator which generates a triangular wave signal;
a pulse-width-modulation comparator which compares error voltage outputted from said error amplifier with the triangular wave signal outputted from said triangular wave signal generator so as to output a pulse-width modulation- signal;
a logic control unit which performs a switching control of the current across the primary coil of the transformer, based on the pulse-width-modulation signal outputted from said pulse-width-modulation comparator; and
a frequency control unit which monitors detection voltages according to the drive current flowing through the secondary coil of the transformer and a drive voltage supplied to the fluorescent lamp from the inverter, respectively, and which raises the frequency of the triangular wave signal when a first detection voltage according to the drive current is lower than a first predetermined threshold voltage or a second detection voltage according to the drive voltage is higher than a second predetermined threshold voltage;
a drive voltage detection unit which converts the drive voltage, supplied to the fluorescent lamp to be driven, into a direct-current voltage by half-wave rectifying the drive voltage and feeds back the voltage to said control circuit as the first detection voltage; and
a current-voltage conversion unit, provided on a current path of the secondary coil of said transformer, which converts drive current flowing through the secondary coil into voltage so as to be fed back to said control circuit as the second detection voltage.

31. A light emitting device, comprising:
a fluorescent lamp; and
an inverter which supplies output voltage to said fluorescent lamp as a drive voltage, the inverter comprising:
a transformer in which a fluorescent lamp to be driven is connected to a secondary coil thereof;
a control circuit which performs a switching control on current across a primary coil of said transformer, the control circuit comprising:
an error amplifier which amplifies error between a dimming control voltage to adjust the luminance of a fluorescent lamp to be driven and a detection voltage according to a drive current flowing through a secondary coil of a transformer in the inverter;
a triangular wave signal generator which generates a triangular wave signal;
a pulse-width-modulation comparator which compares error voltage outputted from said error amplifier with the triangular wave signal outputted from said triangular wave signal generator so as to output a pulse-width modulation-signal;
a logic control unit which performs a switching control of the current across the primary coil of the transformer, based on the pulse-width-modulation signal outputted from said pulse-width-modulation comparator; and
a frequency control unit which monitors detection voltages according to the drive current flowing through the secondary coil of the transformer and a drive voltage supplied to the fluorescent lamp from the inverter, respectively, and which raises the frequency of the triangular wave signal when a first detection voltage according to the drive current is lower than a first predetermined threshold voltage or a second detection voltage according to the drive voltage is higher than a second predetermined threshold voltage;
a drive voltage detection unit which converts the drive voltage, supplied to the fluorescent lamp to be driven, into a direct-current voltage by half-wave rectifying the drive voltage and feeds back the voltage to said control circuit as the first detection voltage; and
a current-voltage conversion unit, provided on a current path of the secondary coil of said transformer, which converts drive current flowing through the secondary coil into voltage so as to be fed back to said control circuit as the second detection voltage.

32. A light emitting device according to claim 31, wherein a plurality of said fluorescent lamps are connected in parallel.

33. A light emitting device according to claim 31, wherein two of said inverters are provided at both ends of said fluorescent lamp, respectively, and supply drive voltages of mutually reversed phases to said fluorescent lamp.

34. A light emitting device according to claim 31, wherein said fluorescent lamp is an external electrode fluorescent lamp.

35. A light emitting device according to claim 31, wherein said fluorescent lamp is a cold cathode fluorescent lamp.

36. A liquid-crystal television, comprising:
a liquid-crystal panel; and
a plurality of light emitting devices arranged on a backside of said liquid-crystal panel, at least one of the plurality of light emitting devices comprising:
a fluorescent lamp; and
an inverter which supplies output voltage to said fluorescent lamp as a drive voltage, the inverter comprising:
a transformer in which a fluorescent lamp to be driven is connected to a secondary coil thereof;
a control circuit which performs a switching control on current across a primary coil of said transformer, the control circuit comprising:
an error amplifier which amplifies error between a dimming control voltage to adjust the luminance of a fluorescent lamp to be driven and a detection voltage according to a drive current flowing through a secondary coil of a transformer in the inverter;

a triangular wave signal generator which generates a triangular wave signal;

a pulse-width-modulation comparator which compares error voltage outputted from said error amplifier with the triangular wave signal outputted from said triangular wave signal generator so as to output a pulse-width modulation-signal;

a logic control unit which performs a switching control of the current across the primary coil of the transformer, based on the pulse-width-modulation signal outputted from said pulse-width-modulation comparator; and a frequency control unit which monitors detection voltages according to the drive current flowing through the secondary coil of the transformer and a drive voltage supplied to the fluorescent lamp from the inverter, respectively, and which raises the frequency of the triangular wave signal when a first detection voltage according to the drive current is lower than a first predetermined threshold voltage or a second detection voltage according to the drive voltage is higher than a second predetermined threshold voltage;

a drive voltage detection unit which converts the drive voltage, supplied to the fluorescent lamp to be driven, into a direct-current voltage by half-wave rectifying the drive voltage and feeds back the voltage to said control circuit as the first detection voltage; and a current-voltage conversion unit, provided on a current path of the secondary coil of said transformer, which converts drive current flowing through the secondary coil into voltage so as to be fed back to said control circuit as the second detection voltage.

* * * * *